US009030505B2

(12) United States Patent
Ashbrook et al.

(10) Patent No.: US 9,030,505 B2
(45) Date of Patent: May 12, 2015

(54) METHOD AND APPARATUS FOR ATTRACTING A USER'S GAZE TO INFORMATION IN A NON-INTRUSIVE MANNER

(75) Inventors: Daniel L. Ashbrook, Sunnyvale, CA (US); Sean M. White, Mountain View, CA (US); David H. Nguyen, Sunnyvale, CA (US); Kent M. Lyons, Santa Clara, CA (US)

(73) Assignee: Nokia Technologies Oy, Espoo (FI)

( * ) Notice: Subject to any disclaimer, the term of this patent is extended or adjusted under 35 U.S.C. 154(b) by 373 days.

(21) Appl. No.: 13/473,681

(22) Filed: May 17, 2012

(65) Prior Publication Data

US 2013/0307762 A1 Nov. 21, 2013

(51) Int. Cl.
*G06Q 30/00* (2012.01)
*G02B 27/00* (2006.01)
*G02B 27/01* (2006.01)

(52) U.S. Cl.
CPC .... *G02B 27/0093* (2013.01); *G02B 2027/0178* (2013.01); *G02B 27/017* (2013.01); *G02B 2027/014* (2013.01); *G02B 2027/0187* (2013.01)

(58) Field of Classification Search
CPC ... G06F 3/013; G06F 11/3065; G06F 11/327; G06F 3/0304; G06Q 30/02; G06Q 30/0201; G06Q 30/0267; H04N 13/0484; H04N 21/478
USPC ......... 345/8, 690; 348/78, E13.047; 705/7.32
See application file for complete search history.

(56) References Cited

U.S. PATENT DOCUMENTS

| | | | | |
|---|---|---|---|---|
| 5,731,805 A * | 3/1998 | Tognazzini et al. | ........... | 345/156 |
| 5,831,594 A * | 11/1998 | Tognazzini et al. | ........... | 345/156 |
| 5,886,683 A * | 3/1999 | Tognazzini et al. | ........... | 715/700 |
| 5,898,423 A * | 4/1999 | Tognazzini et al. | ........... | 345/158 |
| 6,090,051 A * | 7/2000 | Marshall | ........... | 600/558 |
| 6,182,133 B1 * | 1/2001 | Horvitz | ........... | 709/223 |
| 6,307,526 B1 * | 10/2001 | Mann | ........... | 345/8 |
| 6,309,342 B1 * | 10/2001 | Blazey et al. | ........... | 600/26 |
| 6,422,870 B1 * | 7/2002 | Ohsawa | ........... | 434/236 |
| 6,549,625 B1 * | 4/2003 | Rautila et al. | ........... | 380/258 |
| 6,572,020 B2 * | 6/2003 | Barkan | ........... | 235/472.03 |
| 6,614,408 B1 * | 9/2003 | Mann | ........... | 345/8 |
| 7,532,197 B2 | 5/2009 | Clement et al. | | |
| 7,648,366 B1 * | 1/2010 | Poulsen | ........... | 434/236 |
| 8,221,127 B1 * | 7/2012 | Poulsen | ........... | 434/236 |

(Continued)

OTHER PUBLICATIONS

International Search Report and Written Opinion for Application No. PCT/FI2013/050502; dated Aug. 23, 2013.

(Continued)

*Primary Examiner* — Michael J Eurice
(74) *Attorney, Agent, or Firm* — Alston & Bird LLP

(57) ABSTRACT

Methods, apparatuses, and computer program products are herein provided for attracting a user's gaze to information associated with a portion of a display in a non-intrusive manner. A method may include determining to attract a user's gaze to information associated with a portion of a display. The method may further include causing presentation of a visual attractant on the display proximate the portion of the display. The method may further include causing presentation of the visual attractant on the display to be ceased in an instance in which the user's gaze is determined to be moving toward the information. Corresponding apparatuses and computer program products are also provided.

21 Claims, 24 Drawing Sheets

(56) References Cited

U.S. PATENT DOCUMENTS

| | | | |
|---|---|---|---|
| 8,395,656 B1* | 3/2013 | Malzbender et al. | 348/14.16 |
| 2002/0011925 A1* | 1/2002 | Hahn | 340/425.5 |
| 2002/0085843 A1* | 7/2002 | Mann | 396/374 |
| 2002/0116257 A1* | 8/2002 | Helbig | 705/14 |
| 2003/0051255 A1* | 3/2003 | Bulman et al. | 725/135 |
| 2003/0085275 A1* | 5/2003 | Barkan | 235/383 |
| 2003/0110507 A1* | 6/2003 | Dimitrova et al. | 725/110 |
| 2003/0236451 A1* | 12/2003 | El-Nokaly et al. | 600/300 |
| 2004/0103111 A1* | 5/2004 | Miller et al. | 707/102 |
| 2005/0108092 A1* | 5/2005 | Campbell et al. | 705/14 |
| 2005/0243054 A1* | 11/2005 | Beymer et al. | 345/156 |
| 2006/0007396 A1* | 1/2006 | Clement et al. | 351/209 |
| 2006/0028400 A1* | 2/2006 | Lapstun et al. | 345/8 |
| 2006/0037038 A1* | 2/2006 | Buck | 725/9 |
| 2006/0109237 A1* | 5/2006 | Morita et al. | 345/156 |
| 2006/0256133 A1* | 11/2006 | Rosenberg | 345/619 |
| 2007/0127848 A1* | 6/2007 | Kim et al. | 382/305 |
| 2008/0065468 A1* | 3/2008 | Berg et al. | 705/10 |
| 2009/0125849 A1* | 5/2009 | Bouvin et al. | 715/863 |
| 2009/0306741 A1* | 12/2009 | Hogle et al. | 607/54 |
| 2010/0007601 A1* | 1/2010 | Lashina et al. | 345/156 |
| 2010/0009325 A1* | 1/2010 | Afanasiev et al. | 434/236 |
| 2010/0045596 A1* | 2/2010 | De Leon | 345/157 |
| 2010/0149090 A1* | 6/2010 | Morris et al. | 345/156 |
| 2010/0189354 A1* | 7/2010 | de Campos et al. | 382/190 |
| 2010/0226564 A1* | 9/2010 | Marchesotti et al. | 382/159 |
| 2010/0246884 A1* | 9/2010 | Chen et al. | 382/103 |
| 2011/0128223 A1* | 6/2011 | Lashina et al. | 345/158 |
| 2011/0141010 A1* | 6/2011 | Sakata et al. | 345/156 |
| 2011/0161076 A1* | 6/2011 | Davis et al. | 704/231 |
| 2011/0282130 A1* | 11/2011 | Krueger | 600/27 |
| 2011/0298702 A1* | 12/2011 | Sakata et al. | 345/156 |
| 2012/0019645 A1* | 1/2012 | Maltz | 348/78 |
| 2012/0021806 A1* | 1/2012 | Maltz | 455/566 |
| 2012/0032817 A1* | 2/2012 | Cleveland | 340/971 |
| 2012/0078623 A1* | 3/2012 | Vertegaal et al. | 704/231 |
| 2012/0096398 A1* | 4/2012 | Greenspan et al. | 715/808 |

OTHER PUBLICATIONS

Projects; Downloaded on Jul. 17, 2012 from http://www.viz.tamu.edu/faculty/ann/McNamara/Projects.html.

Jaihi Kim, Gang Ryung Park, Steven LeClair; "Process Control Via Gaze Detection Technology", vol. 2; 1999, pp. 1263-1269.

* cited by examiner

METHOD AND APPARATUS FOR ATTRACTING A USER'S GAZE TO INFORMATION IN A NON-INTRUSIVE MANNER

TECHNOLOGICAL FIELD

Example embodiments of the present invention relate generally to user interface technology and, more particularly, relate to methods, apparatuses, and computer program products for attracting a user's gaze to information associated with a portion of a display in a non-intrusive manner.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Increased functionality of these mobile computing devices has led to users being able to perform multiple operations on one device. Each of these operations may have corresponding notifications that may be presented to the user. For example, on just one device, a user may receive notifications for a new email message, an incoming phone call, a task reminder, among others. While these notifications may be helpful, they may be overwhelming and even disruptive of the user's current task. This problem may be compounded with the use of pass-through displays (e.g., head-mounted displays, augmented reality glasses, video or optical see-through displays, etc.) with which the notifications may prove to be distracting, particularly if numerous notifications are provided.

BRIEF SUMMARY

As such, embodiments of the present invention seek to reduce the intrusiveness of notifications, such as visual attractants, while still attracting the user's attention to the important information. In some example embodiments, a device may be configured to cause presentation of the visual attractant on a display to be ceased before a user's gaze actually reaches the information. In such a manner, the intrusiveness of the visual attractant can be reduced, such that the user, in some cases, may not even be consciously aware that their gaze was attracted to the information. Indeed, the user may become subconsciously aware of the information without losing a certain amount of concentration on their current task.

Embodiments of the present invention provide methods, apparatuses, and computer program products for attracting a user's gaze to information associated with a portion of a display in a non-intrusive manner. In one example embodiment, a method includes determining to attract a user's gaze to information associated with a portion of a display. The method further includes causing presentation of a visual attractant on the display proximate the portion of the display. The method further includes causing presentation of the visual attractant on the display to be ceased in an instance in which the user's gaze is determined to be moving toward the information.

In some embodiments, the method may include causing presentation of the visual attractant to be ceased by causing presentation of the visual attractant to be ceased before the user's gaze reaches the information. In some embodiments, the method may further include determining a first separation distance between the user's gaze and the portion of the display, and causing presentation of the visual attractant by causing presentation of the visual attractant in an instance in which the first separation distance is approximately equal to or less than a first pre-determined distance.

In some embodiments, the method may further include determining a second separation distance between the user's gaze and the portion of the display, and causing presentation of the visual attractant to be ceased by causing presentation of the visual attractant to be ceased in an instance in which the second separation distance is approximately a second pre-determined distance.

In some embodiments, the method may include causing presentation of the visual attractant by causing presentation of the visual attractant in an instance in which the information is within a field of vision of the user. In some embodiments, the method may include causing presentation of the visual attractant by determining an intensity of the visual attractant to be presented based at least in part on at least one of the following: a distance between the user's gaze and the portion of the display, an importance level associated with the information, and a number of attempts that have taken place to attract the user's gaze to the information. In such an embodiment, the method may further include causing presentation of the visual attractant at the intensity.

In some embodiments, the method may further include causing presentation of the visual attractant to resume in an instance in which the user's gaze is determined to not yet have focused on the information.

In some embodiments, the method may further include determining a second portion of the display where the user's gaze was focused before presentation of the visual attractant on the display, and causing presentation of a second visual attractant proximate the second portion of the display.

In another example embodiment, an apparatus includes at least one processor and at least one memory storing computer program code, wherein the at least one memory and stored computer program code are configured, with the at least one processor, to cause the apparatus to determine to attract a user's gaze to information associated with a portion of a display. The at least one memory and stored computer program code are configured, with the at least one processor, to further cause the apparatus to cause presentation of a visual attractant on the display proximate the portion of the display. The at least one memory and stored computer program code are configured, with the at least one processor, to further cause the apparatus to cause presentation of the visual attractant on the display to be ceased in an instance in which the user's gaze is determined to be moving toward the information.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method comprising determining to attract a user's gaze to information associated with a portion of a display. The method further includes causing presentation of a visual attractant on the display proximate the portion of the display. The method further includes causing presentation of the visual attractant on the display to be ceased in an instance in which the user's gaze is determined to be moving toward the information.

In another example embodiment, an apparatus is provided. The apparatus comprises means for determining to attract a user's gaze to information associated with a portion of a display. The apparatus further includes means for causing presentation of a visual attractant on the display proximate the portion of the display. The apparatus further includes means for causing presentation of the visual attractant on the display to be ceased in an instance in which the user's gaze is determined to be moving toward the information.

BRIEF DESCRIPTION OF THE DRAWINGS

Figure 1:
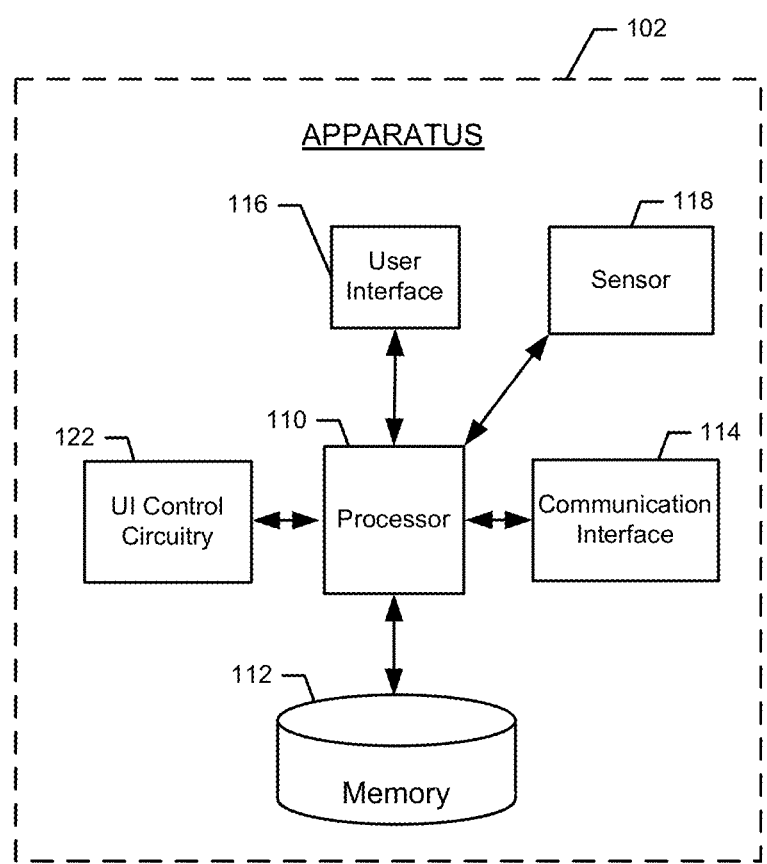
Figure 2:
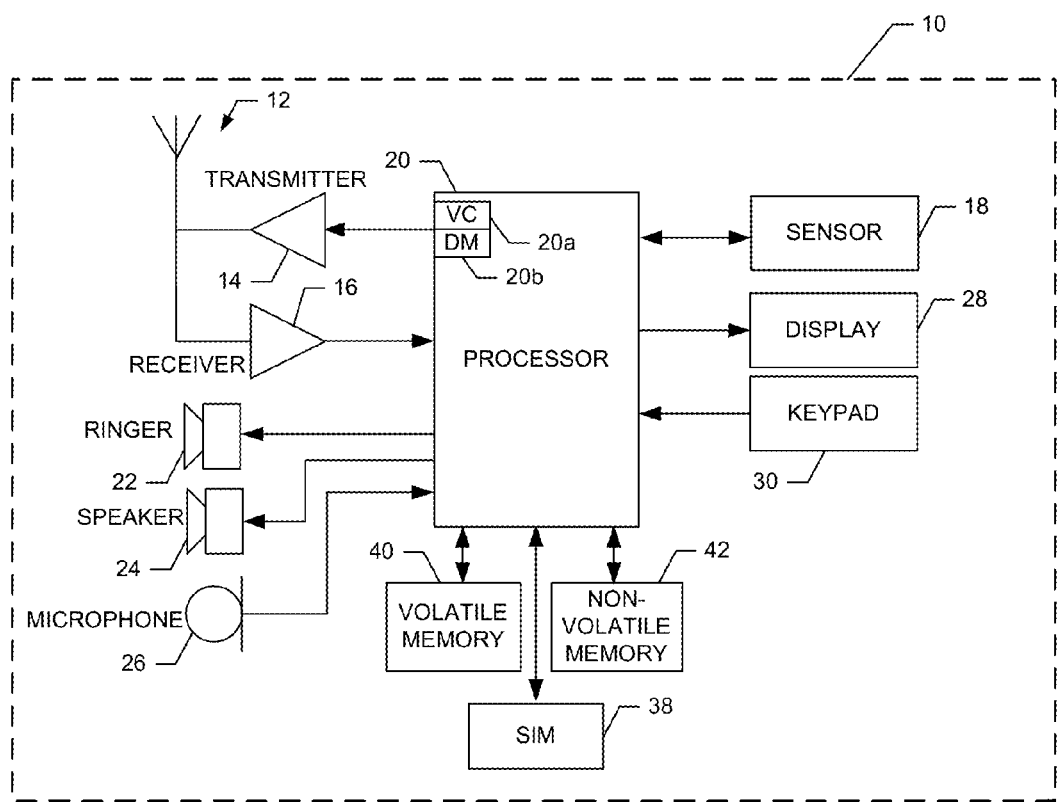
Figure 3A:
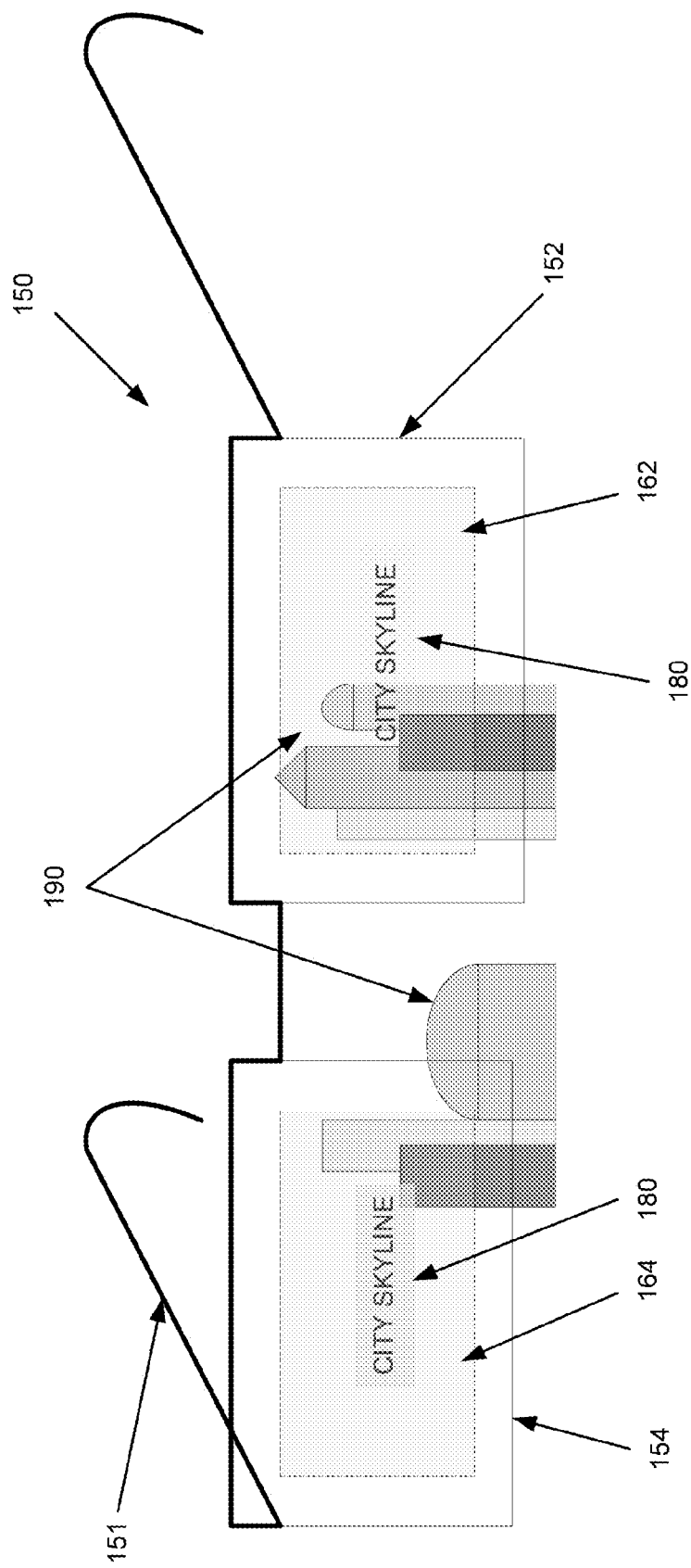
Figure 3B:
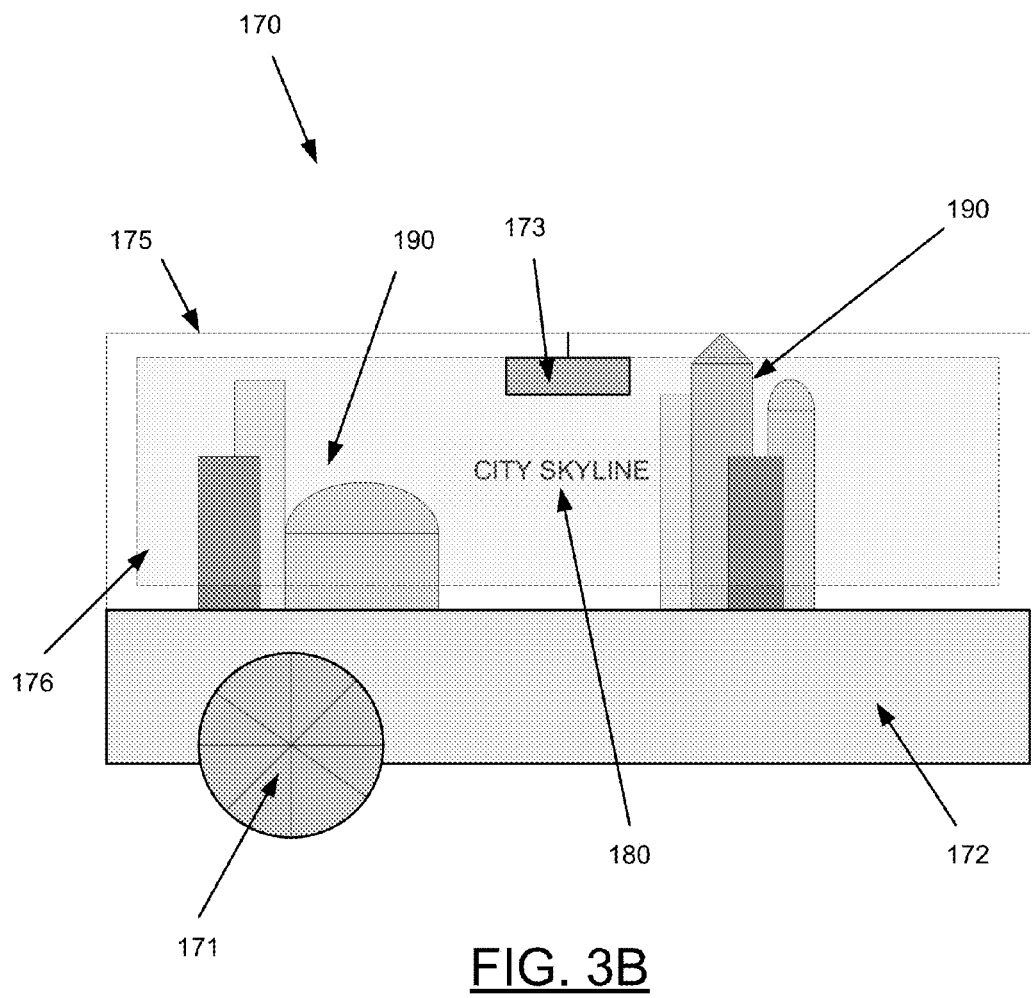
Figure 4A:
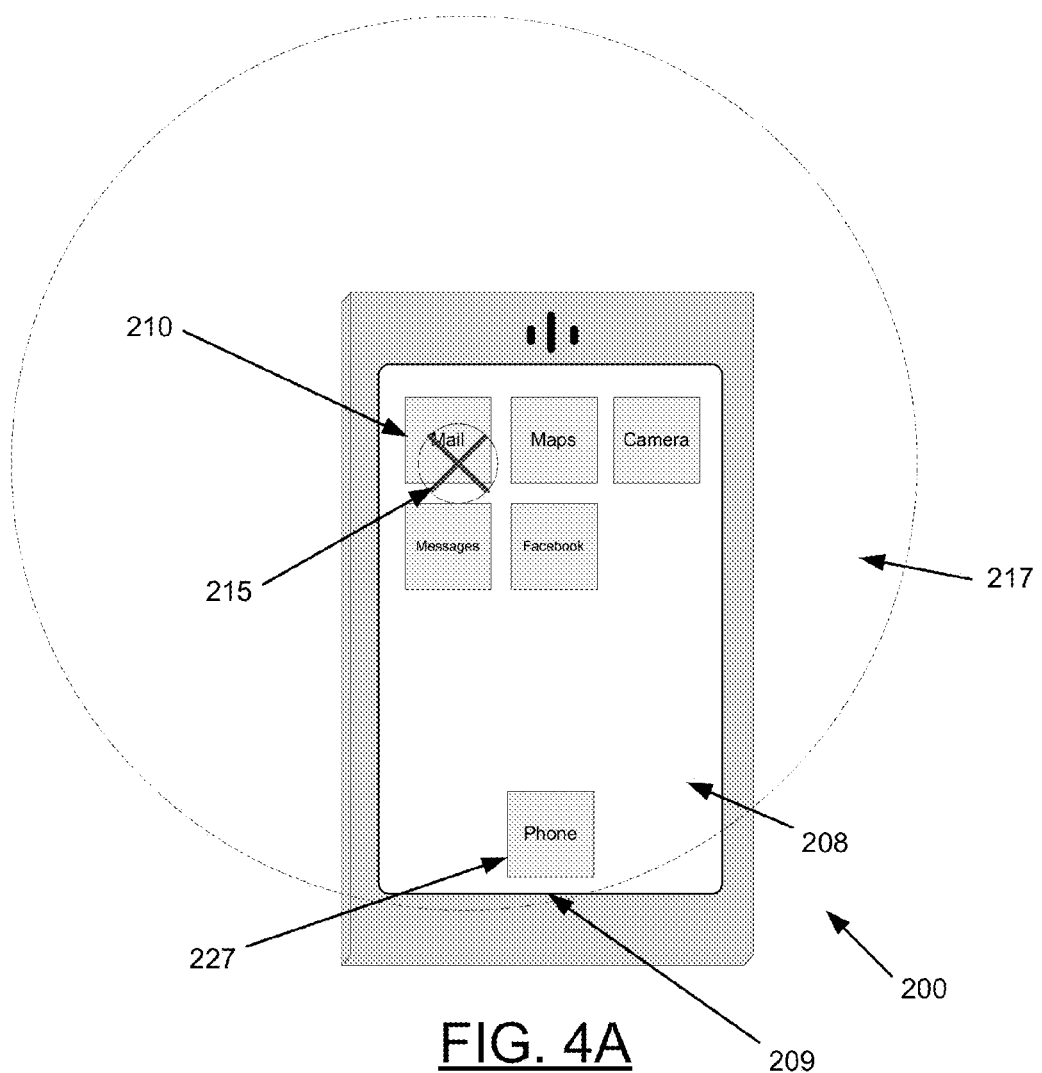
Figure 4B:
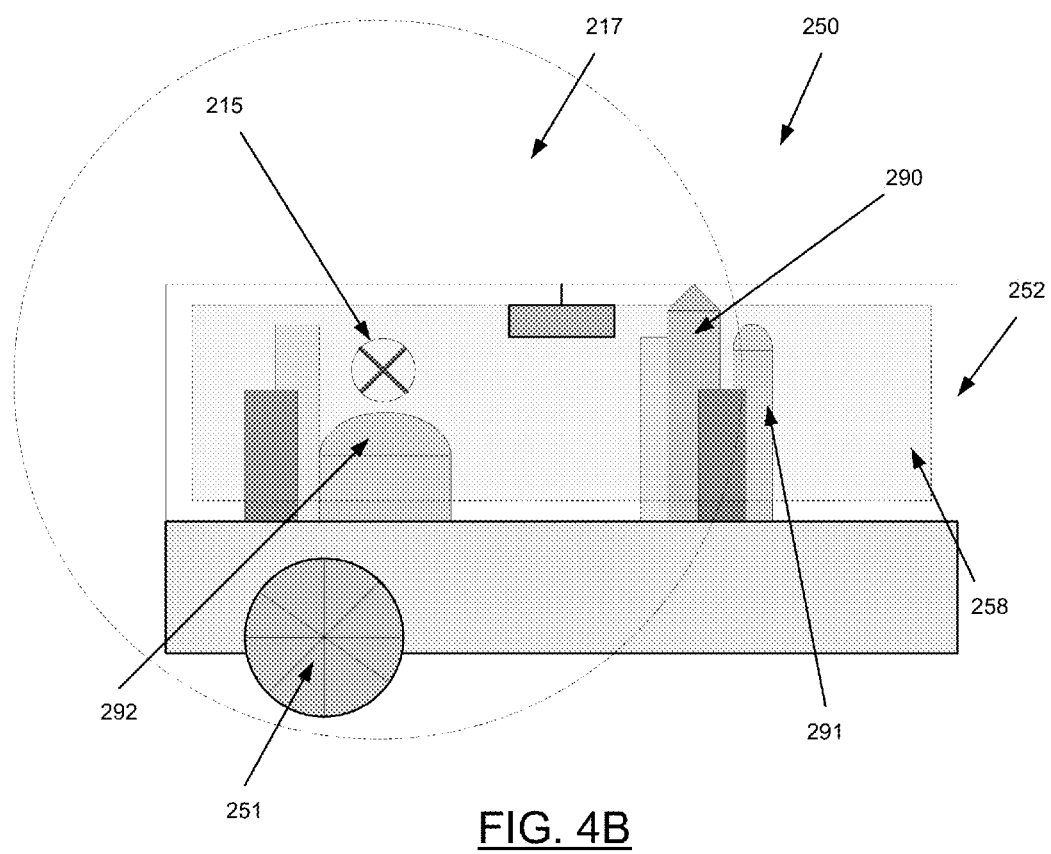
Figure 5A:
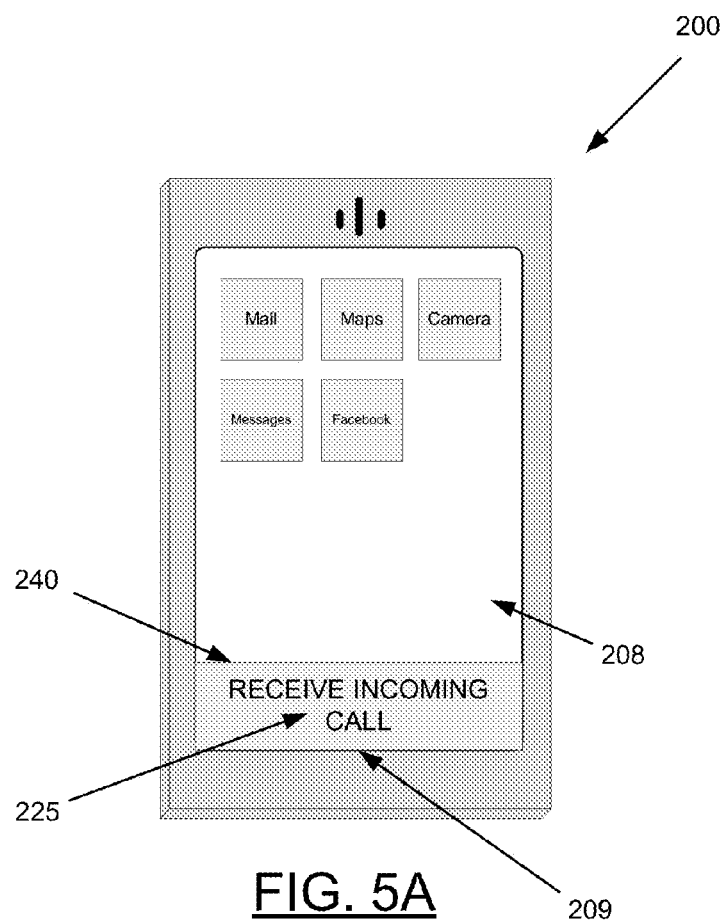
Figure 5B:
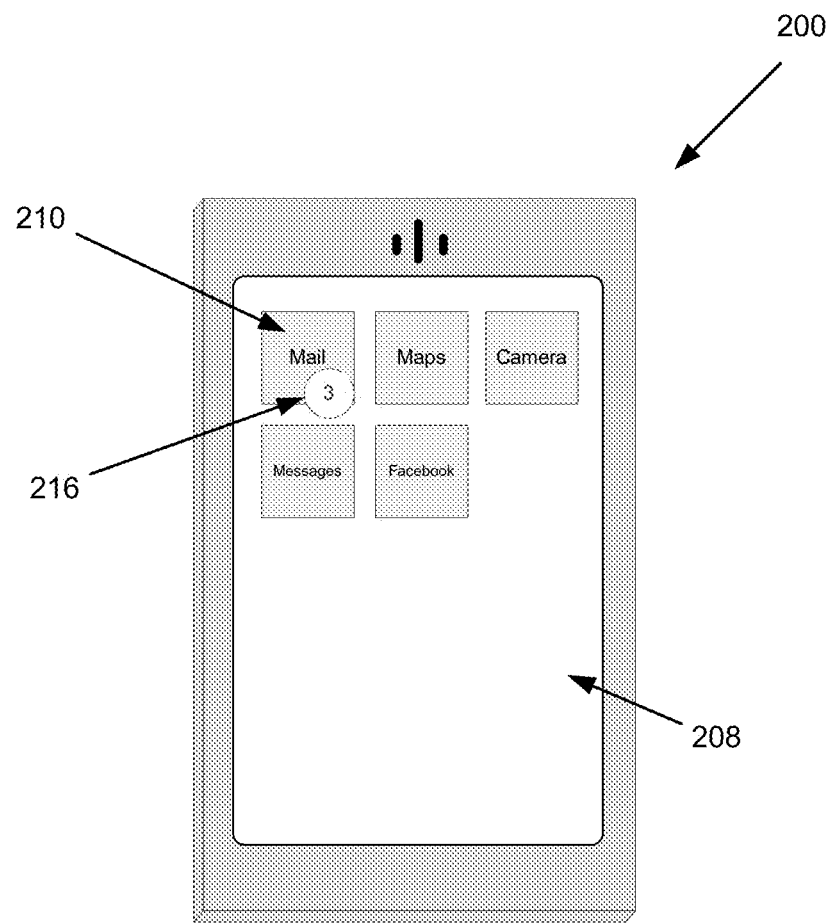
Figure 5C:
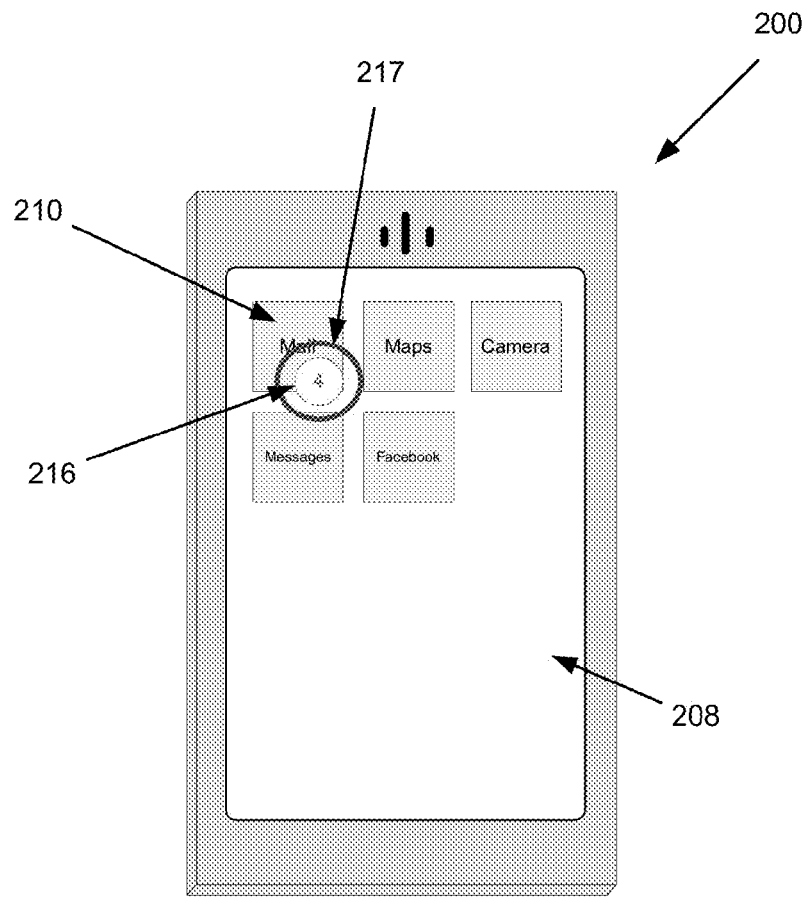
Figure 5D:
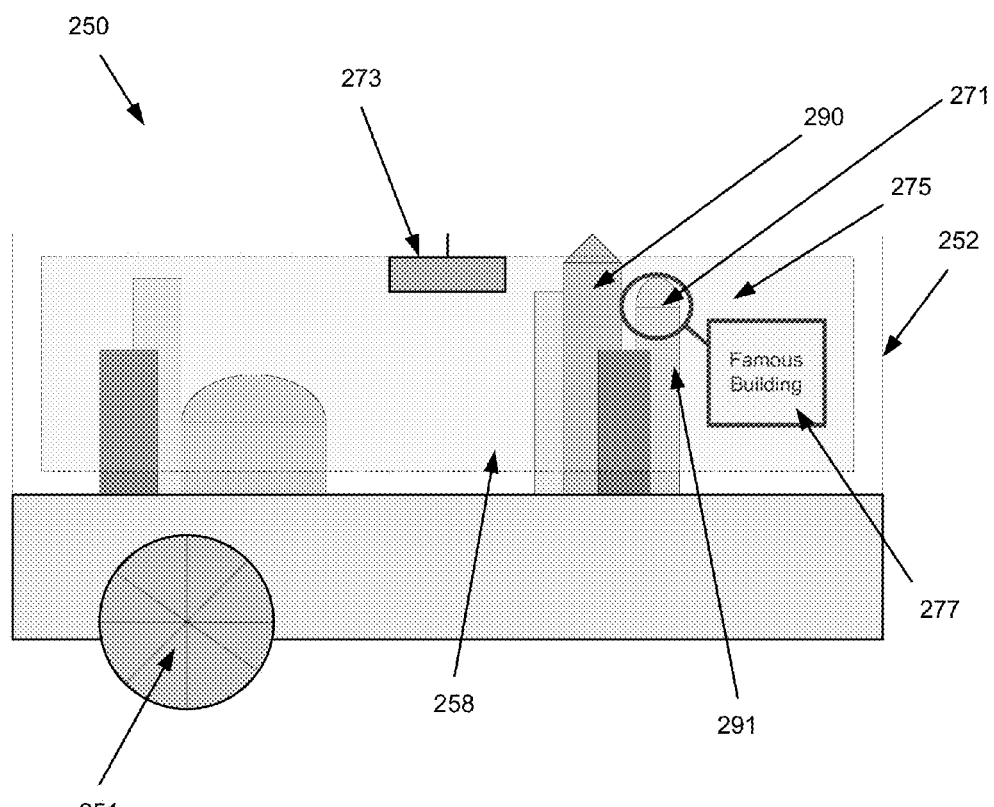
Figure 6A:
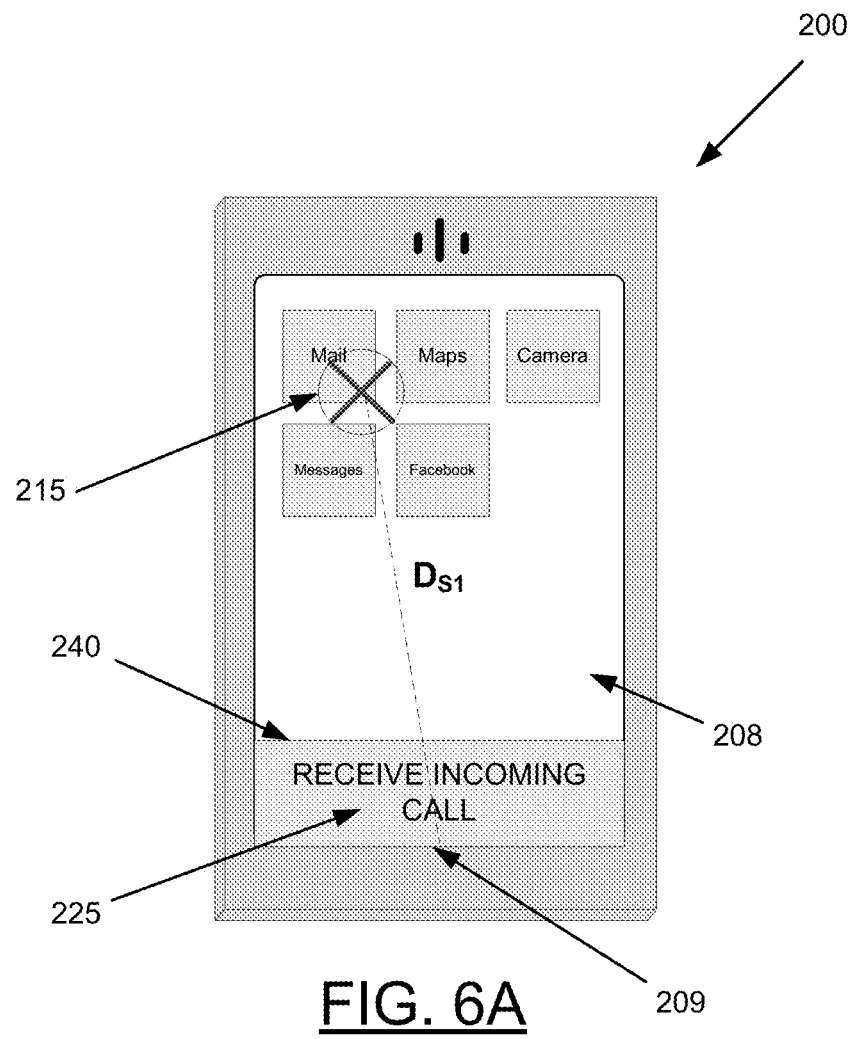
Figure 6B:
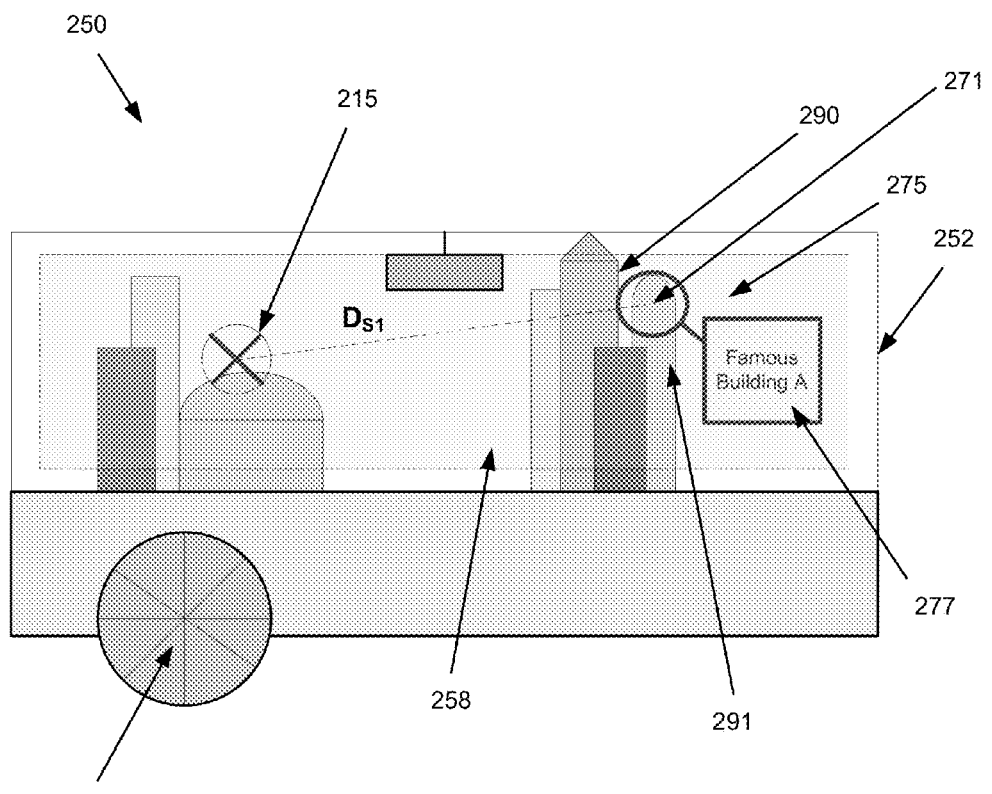
Figure 7A:
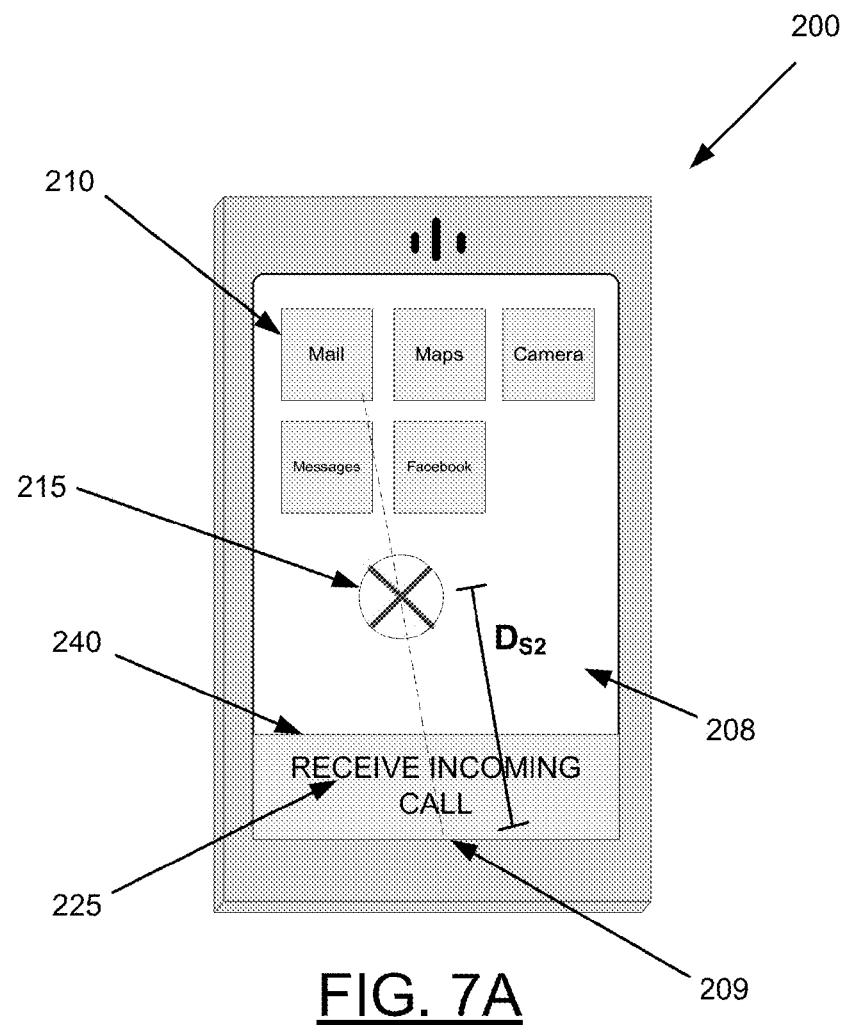
Figure 7B:
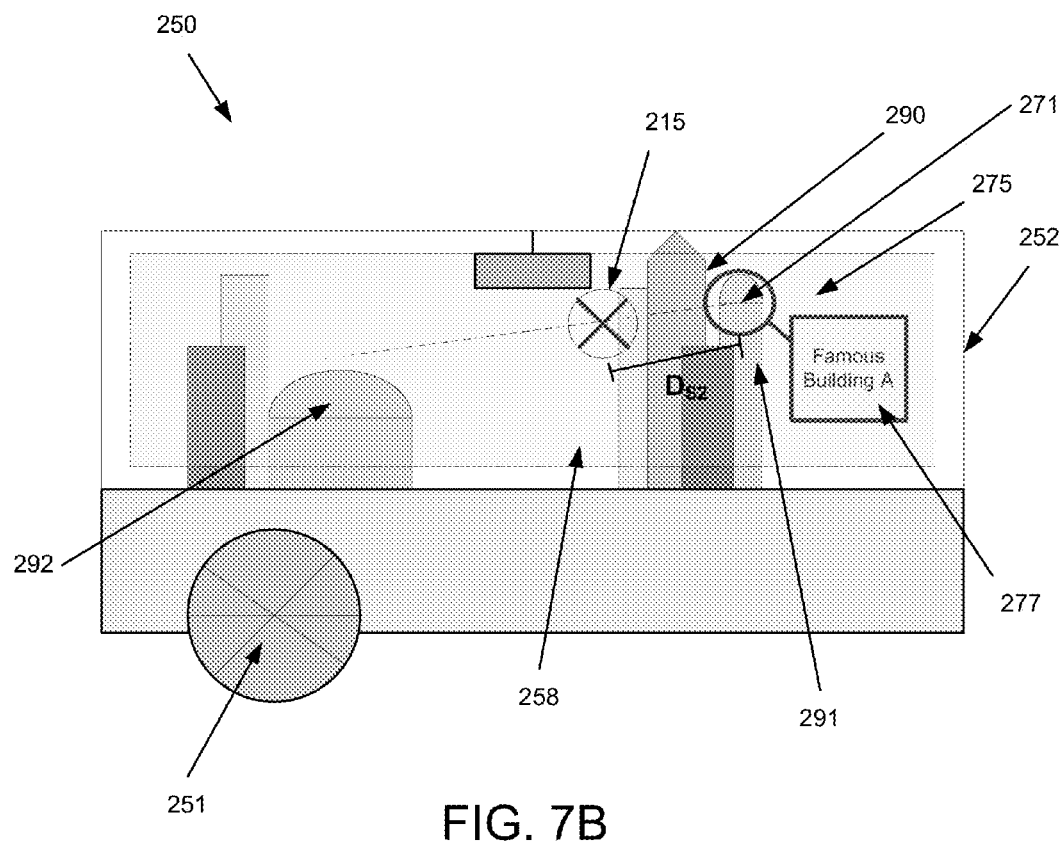
Figure 8A:
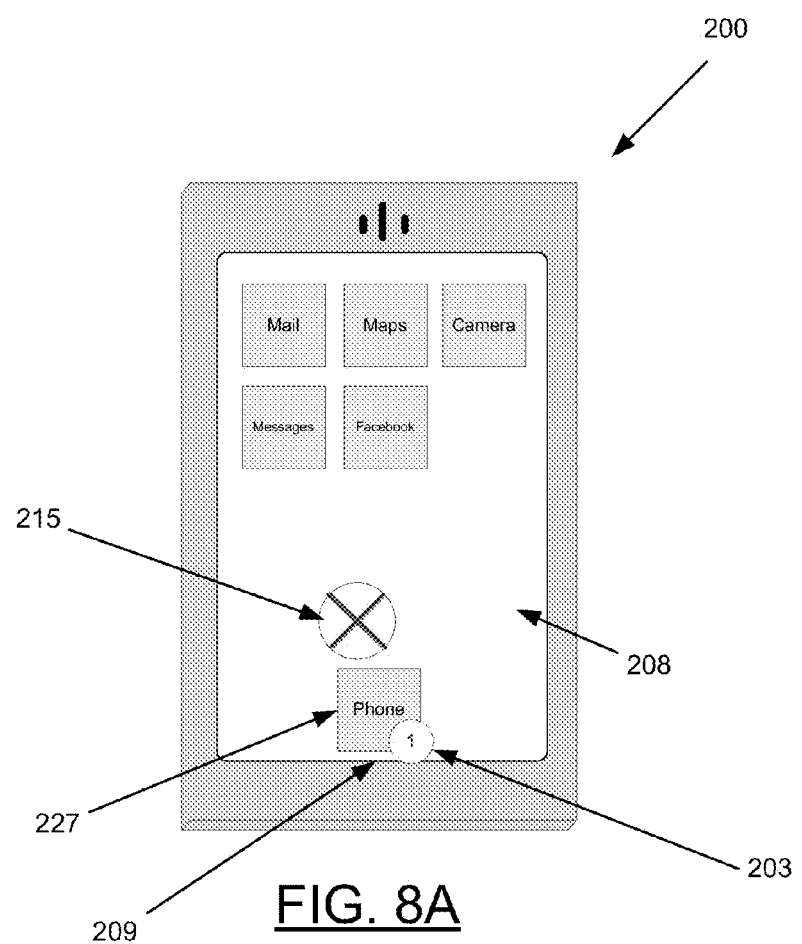
Figure 8B:
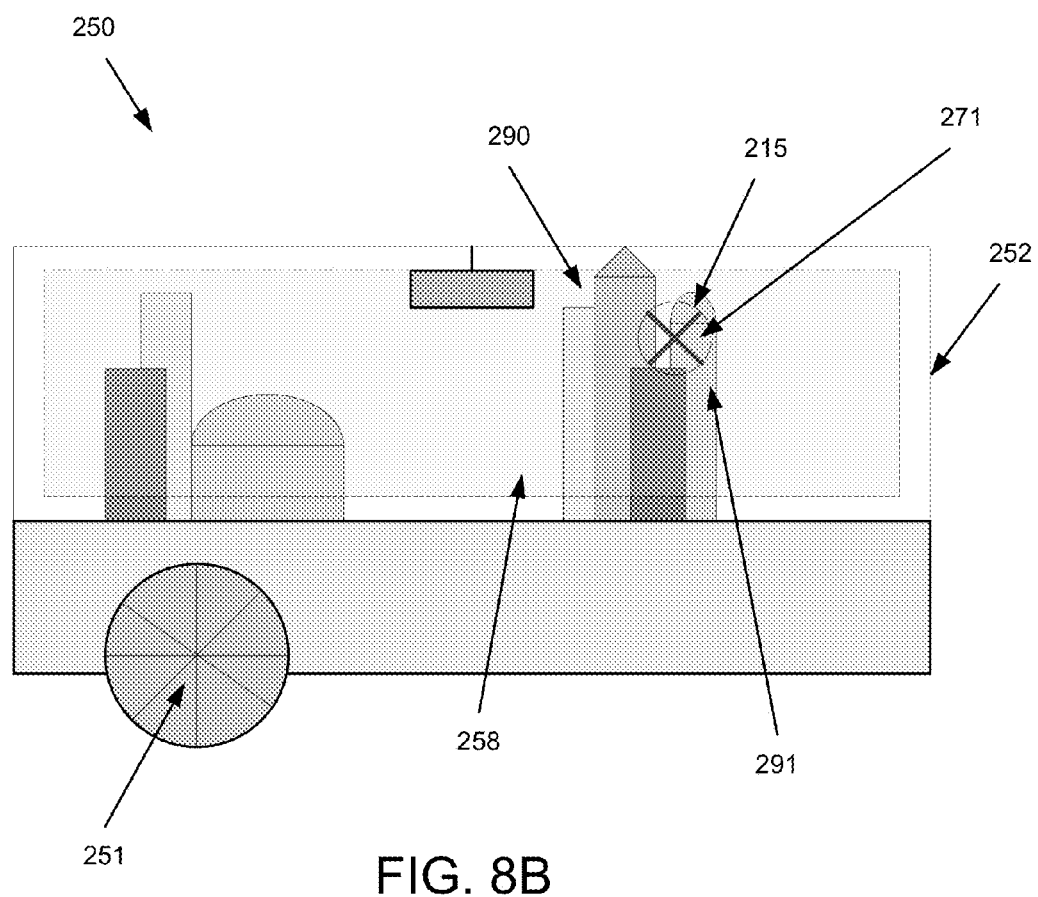
Figure 9A:
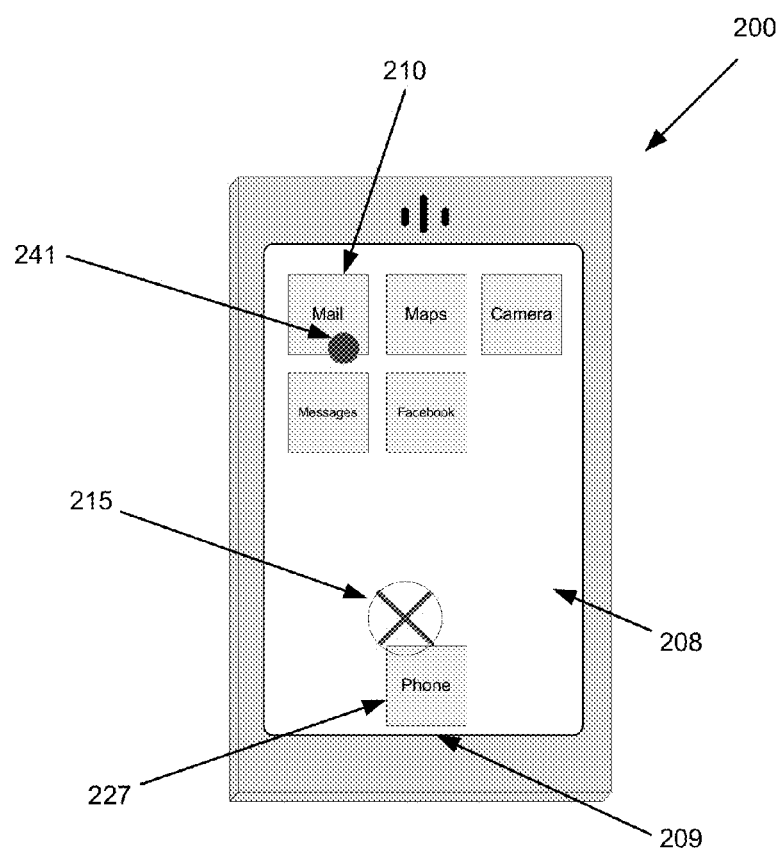
Figure 9B:
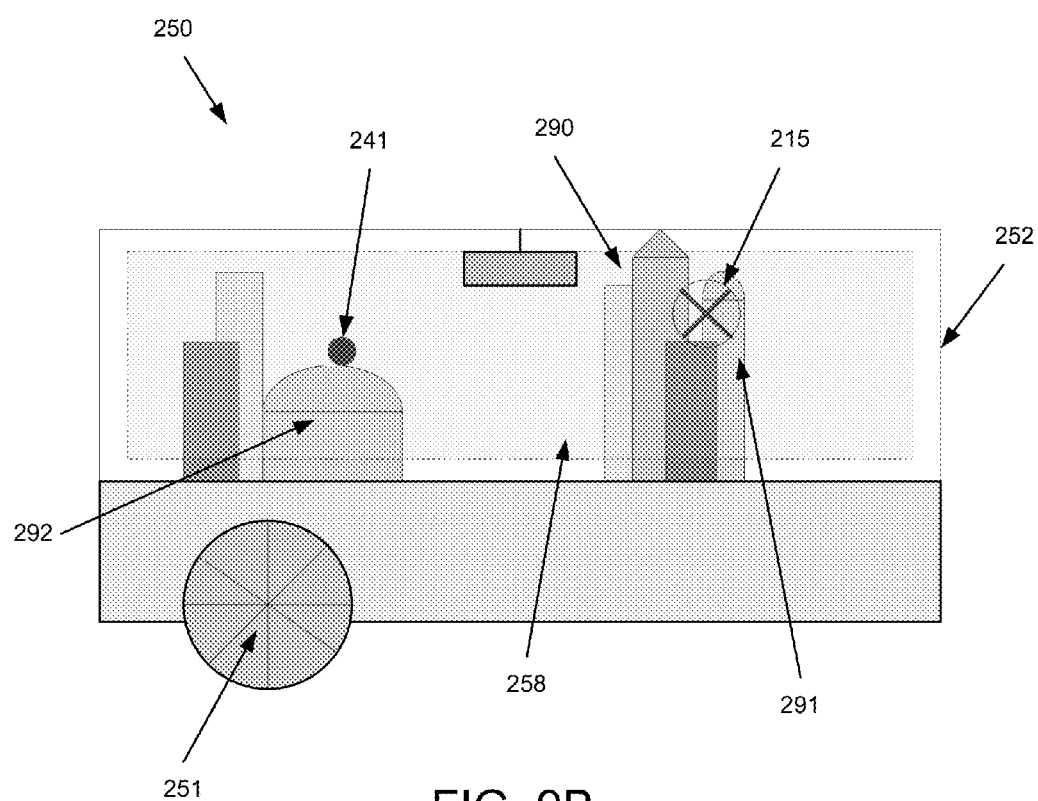
Figure 10A:
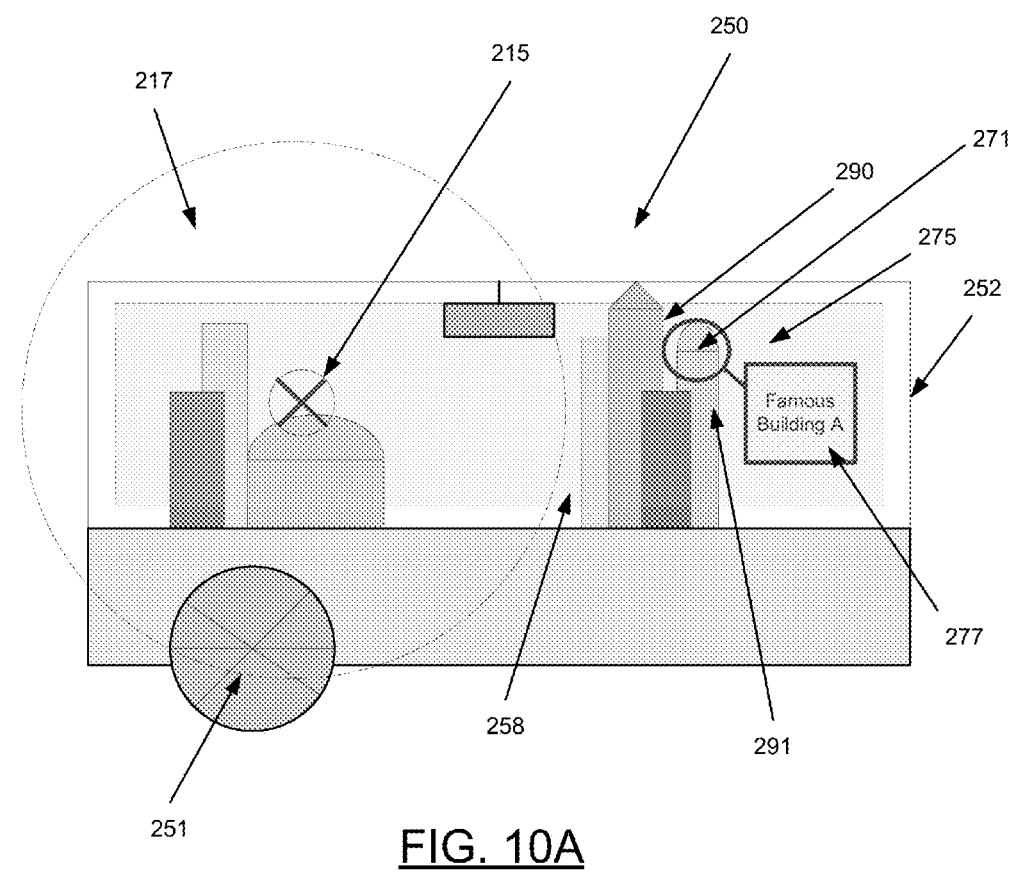
Figure 10B:
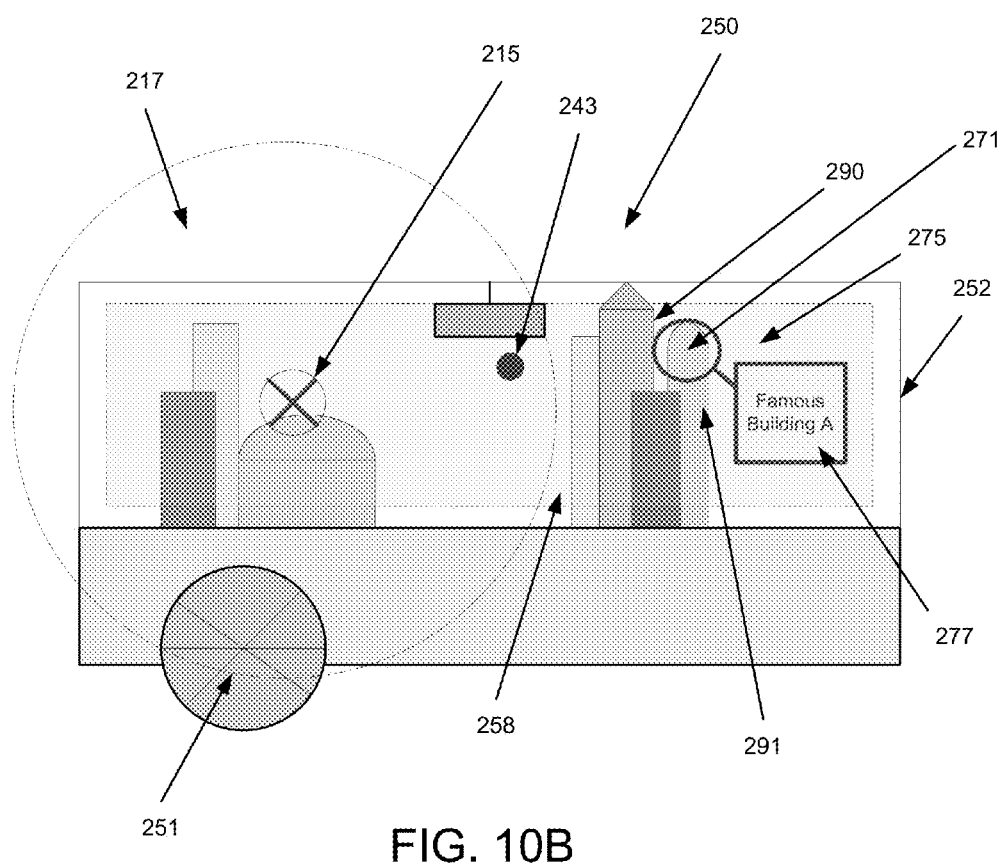
Figure 10C:
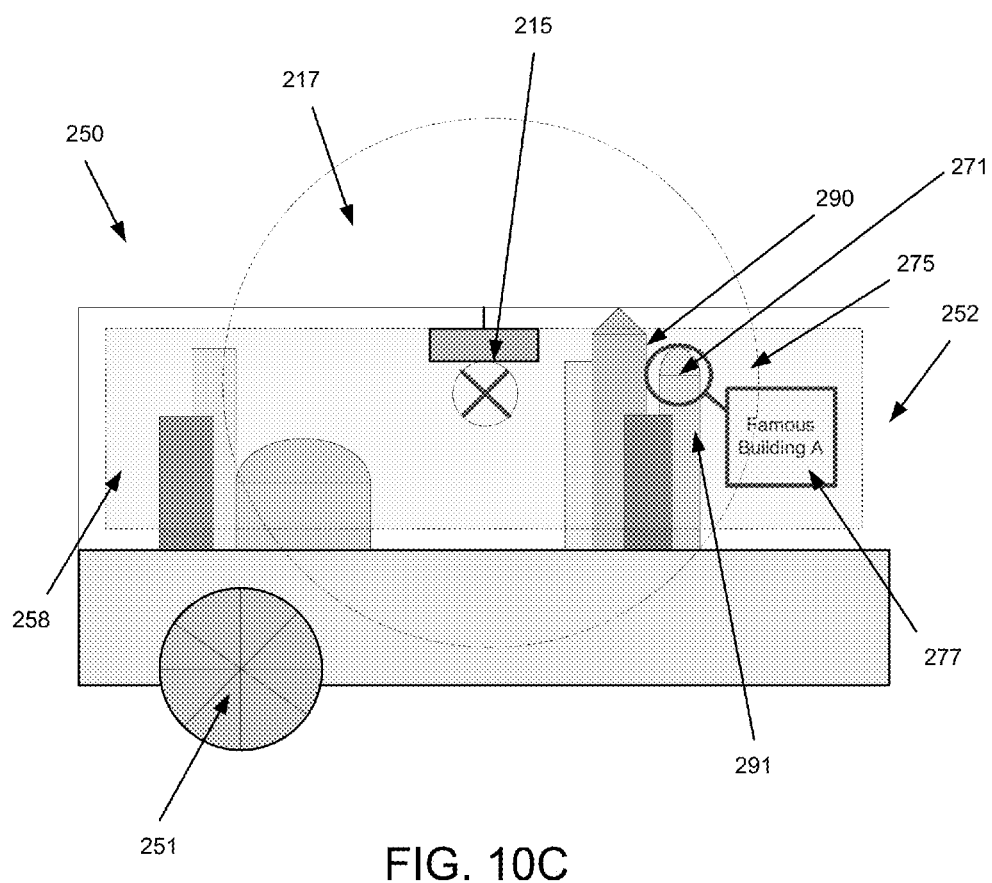
Figure 11:
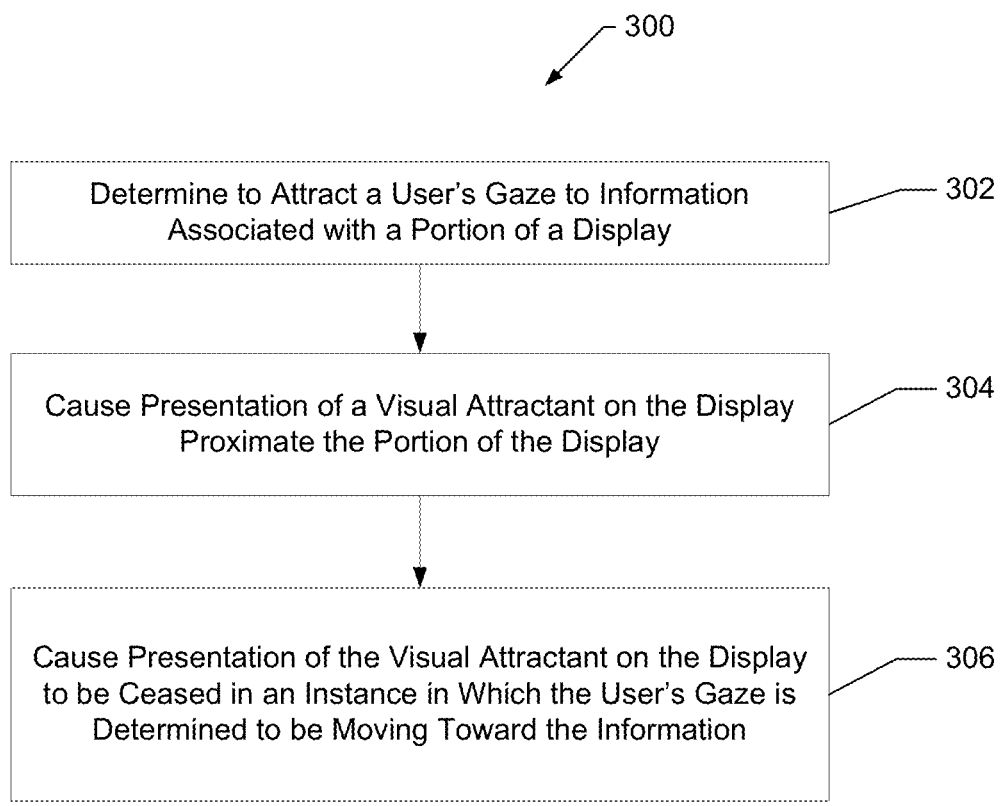
Figure 12:
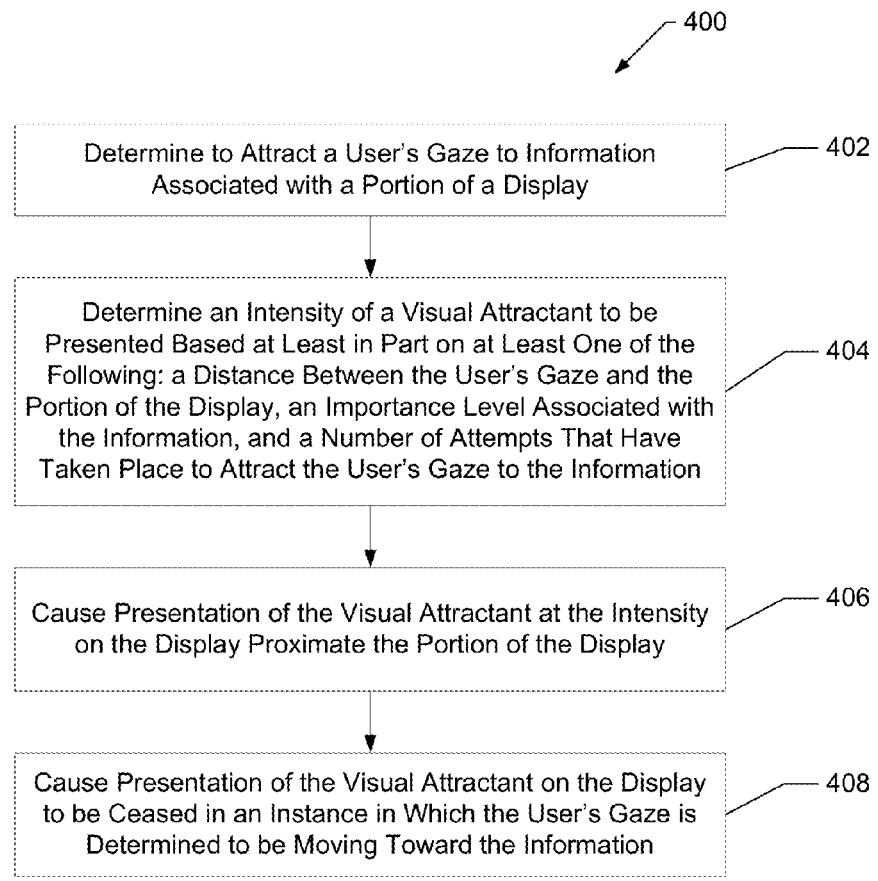
Figure 13:
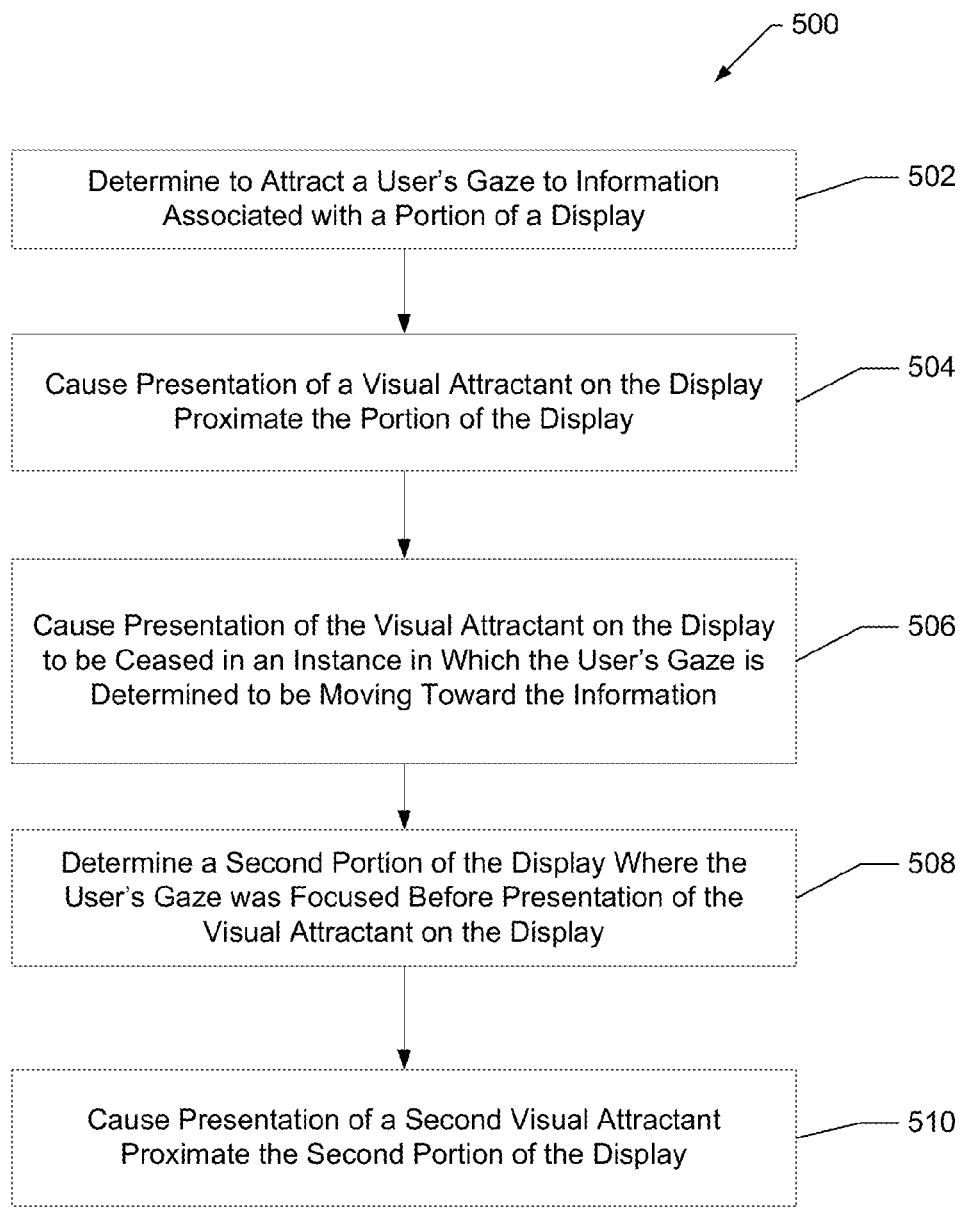

Having thus described embodiments of the invention in general terms, reference will now be made to the accompanying drawings, which are not necessarily drawn to scale, and wherein:

FIG. 1 illustrates a block diagram of an apparatus with a user interface according to an example embodiment;

FIG. 2 is a schematic block diagram of a mobile terminal according to an example embodiment;

FIG. 3A illustrates an example head-mounted display, wherein the display is pass-through such that a city skyline can be seen through the display, in accordance with an example embodiment of the present invention;

FIG. 3B illustrates an example windshield display for a car, wherein the display is pass-through such that a city skyline can be seen through the display, in accordance with an example embodiment of the present invention;

FIG. 4A illustrates an example device with a display, wherein a user's gaze is located on the "Mail" icon on the display, in accordance with an example embodiment described herein;

FIG. 4B illustrates an example car with a windshield with a pass-through display, wherein a user's gaze is located above a stadium in a city skyline, in accordance with an example embodiment described herein;

FIG. 5A illustrates the device shown in FIG. 4A, wherein a visual attractant is presented proximate information regarding an incoming call, in accordance with an example embodiment described herein;

FIG. 5B illustrates the device shown in FIG. 4A, wherein a visual attractant is presented proximate the "Mail" icon, in accordance with an example embodiment described herein;

FIG. 5C illustrates the device shown in FIG. 4A, wherein a visual attractant is presented proximate a circle notification corresponding to the "Mail" icon, in accordance with an example embodiment described herein;

FIG. 5D illustrates the windshield shown in FIG. 4B, wherein a visual attractant is presented proximate a portion of the display associated with a famous building, in accordance with an example embodiment described herein;

FIG. 6A illustrates the device shown in FIG. 5A, wherein the user's gaze is focused a distance ($D_{S1}$) away from the visual attractant, in accordance with an example embodiment described herein;

FIG. 6B illustrates the windshield shown in FIG. 5B, wherein the user's gaze is focused a distance ($D_{S1}$) away from the visual attractant, in accordance with an example embodiment described herein;

FIG. 7A illustrates the device shown in FIG. 6A, wherein the user's gaze has moved toward the visual attractant, in accordance with an example embodiment described herein;

FIG. 7B illustrates the windshield shown in FIG. 6B, wherein the user's gaze has moved toward the visual attractant, in accordance with an example embodiment described herein;

FIG. 8A illustrates the device shown in FIG. 7A, wherein presentation of the visual attractant has ceased, in accordance with an example embodiment described herein;

FIG. 8B illustrates the windshield shown in FIG. 7B, wherein presentation of the visual attractant has ceased, in accordance with an example embodiment described herein;

FIG. 9A illustrates the device shown in FIG. 8A, wherein a second visual attractant is presented, in accordance with an example embodiment described herein;

FIG. 9B illustrates the windshield shown in FIG. 8B, wherein a second visual attractant is presented, in accordance with an example embodiment described herein;

FIGS. 10A-10C illustrate an example intermediate positioning of a visual attractant for attracting a user's gaze to a portion of a display that is outside of the user's field of vision, in accordance with an example embodiment described herein;

FIG. 11 illustrates a flowchart according to an example method for attracting a user's gaze to information associated with a portion of a display in a non-intrusive manner, in accordance with an example embodiment described herein;

FIG. 12 illustrates a flowchart according to another example method for attracting a user's gaze to information associated with a portion of a display in a non-intrusive manner, in accordance with an example embodiment described herein; and FIG. 13 illustrates a flowchart according to another example method for attracting a user's gaze to information associated with a portion of a display in a non-intrusive manner, in accordance with an example embodiment described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for attracting a user's gaze to information associated with a portion of a display in a non-intrusive manner. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a user interface, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a display. In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs (e.g., applications), which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a pass-through display, a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, sensor 118, and/or UI control circuitry 122, such as via a bus.

The sensor 118 may be in communication with the processor 110, user interface 116, and/or UI control circuitry 122. In embodiments wherein the apparatus 102 is embodied as a mobile terminal 10, the sensor 118 may be embodied as or comprise the sensor 18 (shown in FIG. 2). In some embodiments, the sensor 118 may be configured to track a user's gaze, such as by detecting the location and/or focus point of the user's eyes. For example, the sensor 118 may be configured to transmit a beam or other signal (e.g., an infrared light) that bounces off the user's eyes (e.g., the user's cornea). The sensor 118 may also be configured to receive the beam or other signal upon its return. Additionally or alternatively, the sensor 118 may use other functionality including, but not limited to pictures and/or video taken with a camera and/or detecting change in the user's eye-muscle related electrical activity, among others, to track the user's gaze. This information may be used to determine the location of the user's gaze. Along these same lines, the sensor 118 may be configured to detect the size of a user's pupil in order to determine the user's focus point in a three-dimensional environment (e.g., depth of the user's focus point). In some embodiments, the sensor 118 may provide output (e.g., signals, beams, pictures, videos, etc.) to the processor 110 to enable the processor 110 to determine certain circumstances regarding the user's gaze (e.g., location, focus point, etc.). Similarly, the sensor 118 may be configured to monitor other features of the user, such as the degree of movement of the user's gaze, movement of the user's eyelids, among others. In some embodiments, the sensor 118 may comprise a gaze tracker. Additionally or alternatively, in some embodiments the sensor 118 may include other types of sensors, such as proximity sensor, light sensor, gyroscope, camera, heart rate monitor, and/or accelerometer.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus.

In some embodiments, the user interface 116 may comprise a pass-through display. Likewise, in embodiments wherein the apparatus 102 is embodied as a mobile terminal 10, the display 28 may be embodied as a pass-through display. In some embodiments, a pass-through display may be configured to present images (e.g., text, icons, pictures, videos, visual attractants, etc.) in an at least partially transparent form (e.g., image overlay) such that a user may be able to see through the images being presented.

As such, some example embodiments may provide for an apparatus (e.g., apparatus 102) for providing input through a device comprising a display, such as the glasses 150 shown in FIG. 3A or the windshield 170 shown in FIG. 3B. The apparatus with a pass-through display may provide a visual overlay of images on a substantially transparent display surface, such as through lenses that appear to be normal optical glass lenses. This visual overlay allows a user to view objects and people in their typical, un-obscured field of view while providing additional images that may be displayed on the pass-through display. The visual overlay of the images may be of various opacity ranging from transparent (or 0% opacity) to opaque (or 100% opacity). For example, the images presented on the pass-through display may, in some cases, fully occlude the user's vision beyond the display by being presented in a substantially opaque manner on a substantially transparent display. In some embodiments, the presented images may be partially transparent such that the wearer is able to see the environment beyond the pass-through display. The degree of transparency may be variable from fully transparent, where the image is not shown, to fully opaque or non-transparent, or any degree therebetween.

Example embodiments may also present information at the edges of the pass-through display. For example, the pass-through display of one embodiment may include a central area of the display which is substantially transparent with less transparent and possibly opaque images being presented around the substantially transparent area. Such an embodiment may allow a user to view their environment while also providing images for the user to view.

Presentation of images on a pass-through display coupled with object recognition allows for dynamically interactive images to be presented to a user. Apparatuses with pass-through displays allow for the presentation of two-dimensional (2-D) and/or three-dimensional (3-D) visual elements. Two-dimensional graphical elements rendered in the plane of the display can present the user with a user interface, status elements, or other images as would be viewed on a typical computer screen or display of a mobile terminal (e.g., display 28 of mobile terminal 10). Similarly, three-dimensional graphical elements may be rendered on top of the display or on top of the environment and seen through the pass-through display. In such a manner, these visual elements can communicate messages, alert the user with a notification, render an application that is currently in use, etc. Additionally, these visual elements may provide images regarding an object that a user of the pass-through display is viewing through the display, such as by identifying a point-of-interest or landmark that a user is viewing. Such identification may be accomplished by various means including object recognition software or object recognition in conjunction with location identification (e.g., via Global Positioning System (GPS) signals) of the apparatus (e.g., apparatus 102) or the device that embodies the apparatus, such as mobile terminal 10.

Some examples of apparatuses (e.g., apparatus 102) with a pass-through display are illustrated in FIGS. 3A and 3B. FIG. 3A illustrates an example head-mounted display (e.g., glasses 150) includes a left lens 154 and a right lens 152. Such left and right lens 152, 154 may be configured to interact with a user's left eye and right eye respectively. Additionally, the glasses 150 may include a frame 151 that is configured to engage with a user's head (e.g., ears) to mount to the user's head.

In some embodiments, the glasses 150 may comprise (or be in communication with) a processor (e.g., processor 110) that is configured to control presentation of images. For example, in the depicted embodiment of the glasses 150, the processor may be configured to control presentation of images to create a left lens display 164 and a right lens display 162. In some embodiments, the images presented on the left lens display 164 and right lens display 162 may be independent and/or they may be complementary.

As illustrated in FIG. 3A, a user (not shown) may look through the left lens 154 and right lens 152 and the left lens display 164 and right lens display 162 presented thereupon to see information, such as a city skyline 190. Additionally, in some embodiments, the glasses 150 may be configured to cause presentation on the left lens display 164 and/or right lens display 162. In the depicted embodiment, the description "CITY SKYLINE" 180 is being presented to the user in the left lens displays 164 and right lens display 162 to indicate that the user is looking at the skyline of the city (e.g., through the left lens 154 and right lens 152). Though words are shown as being presented on the display, embodiments of the present invention contemplate presenting other types of images on the display (e.g., pictures, videos, notifications, visual attractants, etc.). Additionally, though the words shown in FIG. 3A are not transparent, embodiments of the present invention contemplate presentation of at least partially transparent images on the display.

FIG. 3B illustrates an example car 170 (e.g., apparatus 102) with a windshield with a pass-through display. In the depicted embodiment, the car 170 includes a dashboard 172, steering wheel 171, rear-view mirror 173 and windshield 175. The windshield 175 includes a display 176. In some embodiments, the car 170 may comprise (or be in communication with) a processor (e.g., processor 110) that is configured to control presentation of images. For example, in the depicted embodiment of the car 170, the processor may be configured to control presentation of images on the display 176 of the windshield 175.

As illustrated in FIG. 3B, a user (not shown) may look through the windshield 175 and the display 176 to see information, such as a city skyline 190. Additionally, in some embodiments, the car 170 may be configured to cause presentation of images on the display 176. In the depicted embodiment, the description "CITY SKYLINE" 180 is being presented to the user on the display 176 to indicate that the user is looking at the skyline of the city (e.g., through the windshield 175). Though words are shown as being presented on the display, embodiments of the present invention contemplate presenting other types of images on the display (e.g., pictures, videos, notifications, visual attractants, etc.). Additionally, though the words shown in FIG. 3A are not transparent, embodiments of the present invention contemplate presentation of at least partially transparent images on the display.

It should also be noted that while FIGS. 3A and 3B each illustrate one example of an apparatus with a pass-through display, numerous other apparatuses configured with a pass-through display are contemplated for embodiments of the present invention (e.g., a helmet visor, a cockpit windshield, etc.). Moreover, embodiments of the present invention are not meant to be limited to apparatuses with pass-through displays, and may be useful with other example apparatuses, such as any apparatus 102 (e.g., mobile terminal 10) described herein (e.g., a mobile computing device, a fixed computing device, etc.) having or associated with a display.

Returning to FIG. 1, the UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, sensor 118, and/or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The apparatus 102 may be configured to determine the location of a user's gaze. Additionally, in some embodiments, the apparatus 102 may be configured to determine the focus point of the user's gaze. In some embodiments, the apparatus 102 may be configured to detect the location and/or focus point of the user's gaze, such as with sensor 118, which, as noted above, may comprise a gaze tracker. In such embodiments, the sensor 118 may be configured to provide an output to the apparatus 102 (e.g., processor 110), and the apparatus 102 may determine the location and/or focus point of the user's gaze, based at least in part on the output of the sensor 118. Additionally or alternatively, other components of the apparatus 102 may be configured to determine the location and/or focus point of the user's gaze.

In some embodiments, the apparatus 102 may be configured to determine the field of vision of the user. The field of vision may be defined by what the user can actively see (e.g., within the periphery of the user's gaze). In some embodiments, the apparatus 102 may determine the field of vision of the user based on a number of factors (e.g., current degree of focus of the user, visual ability of the user, a pre-determined field of vision based on the current location and/or focus point of the user, etc.). Though the below example embodiments detail a user's field of vision as a circular area (e.g., area 217), other shapes are contemplated (e.g., ellipse, rectangle, square, non-uniform shape, etc.).

FIG. 4A illustrates an example device 200 that may embody the apparatus 102 with a display 208. Icons, such as the "Mail" icon 210, are presented on the display 208. The device 200, such as through its various components (e.g., sensor 118, user interface 116, etc.), may determine the location and/or focus point of the user's gaze (e.g., "X" 215) to be approximately near the "Mail" icon 210. Additionally, the device 200 may determine the field of vision of the user to be the area 217 (e.g., a radial distance extending outwardly from the location and/or focus point of the user's gaze 215). In some embodiments, the device 200 may determine that a phone call in incoming, and in response, the device 200 may be configured to relay an indication of the incoming call to the user, such as near the bottom portion 209 of the display 208 (e.g., the "Phone" icon 227). In such an embodiment, the information (e.g., an indication of an incoming phone call as represented by the "Phone" icon 227) is located inside of the user's field of vision 217.

FIG. 4B illustrates an example car 250 that may embody the apparatus 102 with a windshield 252 with a pass-through display 258. The car 250 may include a steering wheel 251. A city skyline 290 may be seen through the windshield 252 and the display 258. For example, a famous building 291 in the city skyline 290 may be seen through the display 258. The car 250 (or a component of the car), such as through its various components (e.g., sensor 118, user interface 116, etc.), may determine the location and/or focus point of the user's gaze (e.g., "X" 215) to be approximately above a stadium 292 in the city skyline 290. Additionally, the car 250 may determine the field of vision of the user to be the area 217 (e.g., a radial distance extending outwardly from the location and/or focus point of the user's gaze 215). In such an embodiment, a portion of the famous building 291 is located outside of the user's field of vision 217.

The apparatus 102 may be configured to determine to attract a user's gaze to information associated with a portion of the display. As noted herein, the apparatus 102 may be configured to perform operations (e.g., execute applications, facilitate cellular communication, etc.). In some embodiments, depending on the operation, the apparatus 102 may be configured to notify the user of certain information, such as information related to the operation. For example, with reference to FIG. 5A, a device 200 may receive an indication that a phone call is incoming. The device 200 may determine that a user's gaze should be attracted to the information (e.g., the indication of the incoming phone call). In the depicted embodiment, the device 200 may be configured such that the information relating to the incoming call is presented in a bottom portion 209 of the display 208 (e.g., near the "Phone" icon 227 shown in FIG. 4A). Thus, the device 200 may determine to attract a user's gaze to the indication of the incoming phone call (e.g., information) associated with the bottom portion 209 of the display 208.

FIG. 5B illustrates another example embodiment in which the device 200 may receive an indication that the user has received an email message. The device 200 may determine that a user's gaze should be attracted to the information (e.g., the indication of the new email message). In the depicted embodiment, the device 200 may be configured such that the new email message is associated with a "Mail" icon 210. Thus, the device 200 may determine to attract a user's gaze to the "Mail" icon 210 (e.g., information) associated with the new mail message.

An example embodiment with a pass-through display is illustrated in FIG. 5C. In the depicted embodiment, an apparatus 102 associated with car 250 with a windshield 252 and pass-through display 258 may determine that a famous building 291 of a city skyline 290 is viewable through the display 258. The apparatus 102 associated with the car 250 may determine to attract a user's gaze to the information (e.g., the famous building 291), such as for tour-guide operations, giving directions, etc. As noted above, in some embodiments, the apparatus 102 may be configured to determine that the information (e.g., famous building 291) is associated with a portion of the display 258. This determination may be useful for pass-through displays, in which the information may be beyond the actual display, such as in the example of the famous building 291 that is likely miles down the road, yet still visible through the display 258. Despite this, in the depicted embodiment, the apparatus 102 associated with the car 250 may still determine a portion of the display 258 through which the famous building 291 is viewed. For example, the apparatus 102 associated with the car 250 may determine that the famous building may be seen through a portion of the display from the perspective of the user (e.g., in the line of sight of the user), which in the case of the car may be the driver and/or any passenger. In particular, the car 250 may determine that portion 271 of the display 258 (e.g., to the right of the rear-view mirror 273) is associated with the famous building 291. Thus, the car 250 may determine to attract the user's gaze to the information (e.g., the famous building 291) associated with the portion 271 of the display 258.

Though the above depicted example embodiments describe information that may be associated with an operation performed by the apparatus 102, any type of information is contemplated for embodiments of the present invention.

In some embodiments, the apparatus 102 may be configured to cause presentation of a visual attractant on the display. A visual attractant may be any feature that may be presented on the display to attract the user's attention (e.g., the user's gaze). Example visual attractants include color changes, text, pop-up screens, notifications, numbers, symbols, etc.

In some embodiments, the apparatus 102 may be configured to cause presentation of a visual attractant on the display proximate the portion of the display associated with the information to which the user's attention is to be drawn. As used herein, in some embodiments, proximate may be considered to be in close relation (e.g., in terms of distance) to the portion of the display. Additionally, however, in some embodiments, a visual attractant may be proximate by being positioned between the user's gaze and the portion of the display associated with the information.

For example, with reference to FIG. 5A, the device 200 may cause presentation of a pop-up screen 240 with the text "RECEIVE INCOMING CALL" 225 in response to determining to attract a user's gaze to the information of an incoming call. In the depicted embodiment, the device 200 may cause presentation of the pop-up screen 240 proximate the bottom 209 of the display 208, which may be associated with an indication of the incoming phone call (e.g., the information). In the depicted embodiment, the pop-up screen 240 covers the "Phone" icon 227, shown in FIG. 4A.

FIG. 5B illustrates presentation of another example visual attractant. In the depicted embodiment, the device 200 causes presentation of a circle notification 216 with a number (e.g., "3"). The circle notification 216 is presented in the lower right corner of the "Mail" icon 210 (e.g., proximate the portion of the display associated with the information). The number may refer to the number of unseen email messages the user has. For example, if the device 200 determines a new email message has been sent to the user, the device 200 may cause an update to the number (e.g., update to "4"). Such a visual attractant may be presented in response to the device 200 determining that a new email message has been received and determining to attract the user's gaze to the indication of the new email message (e.g., the information).

In other embodiments, with reference to FIG. 5C, the device 200 may determine to attract the user's gaze to the circle notification 216 with the updated number "4." As such, in the depicted embodiment, the device 200 has presented a larger-hollow circle 217 around the circle notification 216. Thus, the larger-hollow circle 217 (e.g., a visual attractant) may attract the user's gaze to the circle notification 216. Though not shown, as noted herein, other features of a visual attractant may be used in an effort to attract a user's gaze. For example, the device 200 shown in FIG. 5C may cause the larger-hollow circle 217 to flash. Likewise, other visual attractants may be used. For example, with reference to FIG. 5C, the device 200 may not present the larger-hollow circle 217, and alternatively, may cause the circle notification 216 to act as a visual attractant, such as by exhibiting movement (e.g., blinking, flashing, wiggling, etc.).

With reference to FIG. 5D, the car 250 may cause presentation of a visual attractant on the pass-through display 258. In the depicted embodiment, the visual attractant 275 includes a circle presented on the display 258 highlighting the top of the famous building 291. Additionally, the visual attractant 275 includes a text bubble 277 with the words "Famous Building" presented, though other words may be used (e.g., other names, a description, a distance, etc.). The car 250 may cause presentation of the visual attractant 275 proximate the portion 271 of the display 258 associated with the information (e.g., the famous building 291). As noted above, the portion 271 of the display 258 may correspond to the line of sight of the user. For example, the user may look through the portion 271 of the display 258 to see the famous building 192 (e.g., the information). Likewise, the visual attractant 275 may be presented proximate the portion 271 of the display 258 to attract the user's gaze to the portion 271 and, thus, the famous building 291 associated with the portion 271 of the display 258.

In other embodiments, with reference to FIG. 5D, the car 250 may determine to attract the user's gaze to other information, such as the text bubble 277 with the words "Famous Building" presented. In such an embodiment, car 250 may cause a visual attractant to be presented to attract the user's gaze to the text bubble 277. For example, the car 250 may cause the text bubble 277 to move (e.g., flash, wiggle, blink, etc.).

Embodiments of the present invention are not meant to be limited to the above example visual attractants presented in FIGS. 5A, 5B, and 5C, as other visual attractants are contemplated. Additionally, though the above visual attractants are presented in black and white, different colors may be used to aid in attraction of the user's gaze to the information associated with the portion of the display. Additional features (e.g., flashing, blinking, movement, animations, changing colors, etc.) of presenting the visual attractant are also contemplated by some embodiments of the present invention.

In some embodiments, the apparatus 102 may be configured to cause presentation of the visual attractant in an instance in which the information is within the field of vision of the user. In such an embodiment, the apparatus 102 may determine the field of vision of the user, such as described above, and then determine if the information is within the determined field of vision of the user. If the information is within the field of vision (e.g., visually recognizable by the user), then the apparatus 102 may cause presentation of the visual attractant. Such a feature may enable the apparatus 102 to limit causing presentation of the visual attractant to a situation in which the user's gaze could actually be attracted to the information associated with the portion of the display.

Similarly, in some embodiments, the apparatus 102 may be configured to determine a first separation distance between the user's gaze and the portion of the display associated with the information. Then, the apparatus 102 may be configured to cause presentation of the visual attractant in an instance in which the first separation distance is approximately equal to or less than a first pre-determined distance. In some embodiments, the first pre-determined distance may correspond to a maximum distance in which the user may visually recognize the information and/or visual attractant on the display (e.g., the visual attractant and/or information are within the field of vision of the user). For example, with reference to FIG. 6A, the device 200 may determine the current location of the user's gaze at 215. Additionally, the device 200 may determine that the user's gaze 215 is a distance $D_{S1}$ (e.g., a first separation distance) away from the bottom portion 209 of the display 208. The device 200 may determine that this first separation distance is approximately equal to or less than a first pre-determined distance, and in response, cause presentation of the visual attractant 240. For example, with reference to FIG. 4A, the first pre-determined distance may correspond to the radius of the determined field of vision 217.

Though the separation distance between the user's gaze and the portion of the display associated with the information for some embodiments of the present invention are illustrated as a measured distance on a display (e.g., $DS_1$ shown in FIG. 6A) other distances or measurements can be used for determination of the separation distance. For example, the separation distance may be defined by the angular distance between the user's gaze and the portion of the display. This angular distance may be defined as the angle between (i) the user's gaze as defined between the user's eye and the location of the focus point of the user's gaze on the display and (ii) the potential user's gaze at the portion of the display associated with the information as defined between the user's eye and the portion of the display associated with the information.

With reference to FIG. 6B, the apparatus 102 embodied by the car 250 may determine the current location of the user's gaze at 215. Additionally, the car 250 may determine that the user's gaze 215 is a distance $D_{S1}$ (e.g., a first separation distance) away from the portion 271 of the display 258. The apparatus 102 embodied by the car 250 may determine that this first separation distance is approximately equal to or less than a first pre-determined distance, and in response, cause presentation of the visual attractant 275. For example, with reference to FIG. 4B, the first pre-determined distance may correspond to the radius of the determined field of vision 217.

The apparatus 102 may be configured to determine an intensity of the visual attractant. In some embodiments, the apparatus 102 may be configured to determine an intensity of the visual attractant based at least in part on at least one of the following: a distance between the user's gaze and the portion of the display associated with the information; an importance level associated with the information; and a number of attempts that have taken place to attract the user's gaze to the information. In some embodiments, in response to determining the intensity of the visual attractant, the apparatus 102 may be configured to cause presentation of the visual attractant at the determined intensity. As used herein, intensity may refer to the level of presentation of any feature of the visual attractant (e.g., brightness, size, frequency of blinking, etc.).

In such a regard, the apparatus 102 may adaptively determine an intensity of the visual attractant based on the current situation and cause presentation of the visual attractant at that intensity. For example, the apparatus 102 may determine that a higher degree of intensity is more appropriate the further away the user's gaze is from the portion of the display associated with the information. Additionally or alternatively, the apparatus 102 may determine that the degree of intensity should vary with the importance level of the information, such that the visual attractant should have a high degree of intensity when being presented to attract a user's gaze to information with a high importance level (e.g., an overdue important meeting reminder, an urgent message, etc.). Such an importance level may vary and may be configurable by the user or determinable by the apparatus 102 based on certain criteria (e.g., urgency, identity of the sender, etc.). Additionally or alternatively, the apparatus 102 may determine that a higher degree of intensity is more appropriate the more attempts that have taken place to attract the user's gaze to the information. Though the above example embodiments describe three factors for determination of intensity of the visual attractant, other factors are contemplated. Such an embodiment of the apparatus 102 provides for presentation of the visual attractant that is adaptable to the current situation and the degree of importance for attracting the user's gaze to the information.

While a visual attractant may be helpful in notifying a user of important or new information, the visual attractant may be quite distracting for a user. Moreover, due to the increased functionality of devices that may embody apparatus 102, a user may often be presented with a large number of visual attractants throughout the day. However, depending on the context of the user (e.g., the user is currently performing an important task, talking to another person, etc.), even one visual attractant may be invasive or overly disruptive. As such, embodiments of the present invention seek to provide a way for attracting a user's gaze to certain information associated with a portion of the display in a non-intrusive manner.

As such, in some embodiments, the apparatus 102 may be configured to cause presentation of the visual attractant on the display to be ceased before a user's gaze reaches the information. In such a manner, the intrusiveness of the visual attractant can be reduced, such that the user, in some cases, may not be consciously aware that their gaze was attracted to the portion of the display associated with the information because the user never actually recognized the visual attractant. Indeed, the user may become subconsciously aware of the information without a significant reduction in concentration on their current task.

In some embodiments, the apparatus 102 may be configured to determine that the user's gaze is moving toward the information following presentation of the visual attractant. As noted above, in some embodiments, the apparatus 102 may be configured to determine the movement of the user's gaze. For example, with reference to FIG. 7A, the device 200 may determine that the user's gaze 215 has moved from a previous location (e.g., the "Mail" icon 210) toward the bottom portion 209 of the display 208, which is associated with the information (e.g., the indication of the incoming phone call). Likewise, in some situations in which the visual attractant is at or very near the portion of the display associated with the information, the user's gaze may also be determined to be moving toward the visual attractant 240.

With reference to FIG. 7B, the apparatus 102 embodied by the car 250 may determine that the user's gaze 215 has moved from a previous location (e.g., above the stadium 292) toward the portion 271 of the display 258, which is associated with the information (e.g., the famous building 291). Likewise, in some situations in which the visual attractant is at or very near the portion of the display associated with the information, the user's gaze may also be determined to be moving toward the visual attractant 275.

In some embodiments, the apparatus 102 is configured to cause presentation of the visual attractant on the display to be ceased in an instance in which the user's gaze is determined to be moving toward the information. In such a manner, as noted above, in some embodiments, the apparatus 102 may be configured to cause presentation of the visual attractant on the display to be ceased before the user's gaze reaches the information. In such a regard, the visual attractant will be removed before the user's gaze reaches the visual attractant, thereby minimizing the intrusiveness of the visual attractant while still attracting the user's gaze toward the information. Alternatively, in some embodiments, the apparatus 102 may be configured to cause presentation of the visual attractant on the display to be ceased in an instance in which the user's gaze is determined to have reached the information and/or the portion of the display associated with the information.

For example, with reference to FIG. 8A, the device 200 may be configured to cause the visual attractant 240 (shown in FIG. 7A) to cease presentation upon determination that the user's gaze 215 is moving toward the information (e.g., the indication of the incoming phone call) associated with the bottom portion 209 of the display 208. In the depicted embodiment, the visual attractant 240 has disappeared, revealing the "Phone" icon 227. Despite removal of the visual attractant 240 however, the user's gaze has still been attracted to the "Phone" icon 227. In the depicted embodiment, the "Phone" icon 227 may now be presented with a number "1" 203, thereby indicating the incoming phone call. As such, the user's gaze has been attracted to the information (e.g., the indication of the incoming phone call).

Similarly, with reference to FIG. 8B, the apparatus 102 embodied by the car 250 may be configured to cause the visual attractant 275 (shown in FIG. 7B) to cease presentation upon determination that the user's gaze 215 is moving toward the information (e.g., the famous building 291) associated with the portion 271 of the display 258. In the depicted embodiment, the visual attractant 275 has disappeared, removing the circle and text bubble 277. Despite this, the user's gaze has still been attracted to the famous building 291.

In some embodiments, the apparatus 102 may be configured to determine a second separation distance between the user's gaze and the portion of the display associated with the information. Then, the apparatus 102 may be configured to cause presentation of the visual attractant to be ceased in an instance in which the second separation distance is approximately a second pre-determined distance. In some embodiments, the second pre-determined distance may correspond to a minimum distance in which the user may visually recognize the information and cognitively recognize the visual attractant on the display (e.g., the user consciously realizes that the visual attractant has been displayed). In such a manner, the user may be determined to not yet have cognitively recognized the visual attractant when the location of the user's gaze is at least the second pre-determined distance away from the visual attractant and/or the information. Thus, removal of the visual attractant when the user's gaze is approximately the second pre-determined distance away may prevent the user from cognitively recognizing the visual attractant while still being attracted to the information.

For example, with reference to FIG. 7A, the device 200 may determine the current location of the user's gaze at 215. Additionally, the device 200 may determine that the user's gaze 215 is a distance $D_{S2}$ (e.g., a second separation distance) away from the bottom 209 of the display 208. The device 200 may determine that this second separation distance is approximately equal to a second pre-determined distance, and in response, cause presentation of the visual attractant 240 to cease. For example, with reference to FIG. 8A, the visual attractant 240 has been removed from the display, thereby minimizing the intrusiveness of the visual attractant to the user.

With reference to FIG. 7B, the apparatus 102 embodied by the car 250 may determine the current location of the user's gaze at 215. Additionally, the apparatus 102 embodied by the car 250 may determine that the user's gaze 215 is a distance $D_{S2}$ (e.g., a second separation distance) away from the portion 271 of the display 258. The apparatus 102 embodied by the car 250 may determine that this second separation distance is approximately equal to a second pre-determined distance, and in response, cause presentation of the visual attractant 275 to cease. For example, with reference to FIG. 8B, the visual attractant 275 has been removed from the display, thereby minimizing the intrusiveness of the visual attractant to the user.

In some embodiments, the apparatus 102 may be configured to cause presentation of the visual attractant in an instance in which the first separation distance is greater than the second pre-determined distance. Additionally, as noted above, in some embodiments, the apparatus 102 may be configured to cause presentation of the visual attractant in an instance in which the first separation distance is equal to or less than the first pre-determined distance. Thus, in some embodiments, the apparatus 102 may be configured to cause presentation of the visual attractant when the user's gaze is determined to be between the first pre-determined distance and the second pre-determined distance away from the information. Such an embodiment creates a pre-determined zone for the location of the user's gaze in which the visual attractant may be presented and be visually recognized (e.g., within the periphery of the user's vision and/or field of vision of the user) without being cognitively recognized (e.g., able to be focused on by the user). Moreover, as noted above, in some embodiments, presentation of the visual attractant may be caused to cease in an instance in which the user's gaze is determined to be approximately the second pre-determined distance away from the information. Such an embodiment may cause the user's gaze to be attracted to the information without the user cognitively recognizing the visual attract, since the visual attractant will be removed as the user's gaze reaches the second pre-determined distance.

In some embodiments, the apparatus 102 may be configured to determine whether the user has focused on the information. In particular, as is consistent with the disclosure above, the apparatus 102 may be configured to determine what a user has focused on. In example embodiments of an apparatus with a standard display, the apparatus 102 may be configured to determine whether the user's gaze has focused on the portion of the display associated with the information. For example, with reference to FIG. 8A, the device 200 may determine that the user's gaze 215 has focused on the information (e.g., the indication of the incoming phone call), such as by focusing on the "Phone" icon 227. In example embodiments of an apparatus with a pass-through display, the apparatus 102 may be configured to determine whether the user's gaze has actually focused on the information, such as through determination of the depth of the user's gaze. For example, with reference to FIG. 8B, the car 250 may determine that the user's gaze 215 has focused on the famous building 291 through the display 258.

Along these lines, in some embodiments, the apparatus 102 may be configured to cause presentation of the visual attractant to resume in an instance in which the user's gaze is determined to not yet have focused on the information. For example, the device 200 in FIG. 8A may determine that the user has not yet focused on the bottom portion 209 of the display 208 (e.g., the "Phone" icon 227), and may cause presentation of the visual attractant 240 (shown in FIG. 7A) to resume in order to re-attract the user's gaze to the information. Similarly, the apparatus 102 embodied by the car 250 in FIG. 8B may determine that the user has not yet focused on the famous building 291, and may cause presentation of the visual attractant 275 (shown in FIG. 7B) to resume in order to re-attract the user's gaze to the famous building 291.

In some embodiments, the apparatus 102 may be configured to cause resumption of presentation of the visual attractant after a pre-determined amount of time (e.g., 30 seconds, 1 minute, 5 minutes, etc.). In some embodiments, the pre-determined amount of time may be configurable. In some embodiments, the apparatus 102 may be configured to cause resumption of presentation of the visual attractant a pre-determined number of times (e.g., twice, five times, etc.). In some embodiments, the pre-determined number of times may be configurable.

Additionally, in an effort to further aid in a non-intrusive experience for a user, some embodiments of the present invention may be configured to subconsciously return a user's gaze to its original position before the visual attractant was presented. Thus, in some embodiments, the apparatus 102 may be configured to determine a portion of the display where the user's gaze was focused before presentation of the visual attractant on the display, such a portion of the display may be referred to as a second portion of the display. Then, the apparatus 102 may be configured to cause presentation of a second visual attractant proximate the second portion of the display. This second visual attractant is meant to help attract the user's gaze toward the second portion of the display to help return the user's gaze to its original position in a non-intrusive manner. The second visual attractant may be provided some time following the initial visual attractant, such as after the user has had time to view the information.

For example, the device 200 in FIG. 9A may determine that the user's gaze was originally focused on the "Mail" icon 210. As such, the device 200 may cause presentation of a second visual attractant 241 (e.g., a dot) proximate the "Mail" icon 210 to attract the user's gaze back to the "Mail" icon 210. Similarly, the apparatus 102 embodied by the car 250 in FIG. 9B may determine that the user's gaze was originally focused above the stadium 292. As such, the car 250 may cause presentation of a second visual attractant 241 (e.g., a dot) proximate the portion of the display associated with the stadium 292 to attract the user's gaze back toward the stadium 292.

Additionally, in some embodiments, the apparatus 102 may configured to remove the second visual attractant before the user's gaze reaches the second portion of the display. Such example embodiments may provide a fully non-intrusive experience for the user. In particular, the user may be focused on a current task, then the user may be subconsciously attracted to certain information, and then subconsciously returned to the current task in a seamless and non-intrusive fashion.

In some embodiments, the apparatus 102 may be configured to direct a user's gaze to a portion of the display associated with the information even when the information and/or portion of the display associated with the information is outside the user's field of vision. In some embodiments, the apparatus 102 may be configured to cause presentation of an intermediate visual attractant within the user's field of vision. Then, the apparatus 102 may be configured to cause presentation of the intermediate visual attractant to cease when the user's gaze is determined to be moving toward the intermediate visual attractant. Additionally, in some embodiments, the apparatus 102 is configured to cause presentation of the intermediate visual attractant to cease when the user's gaze is determined to be moving toward the intermediate visual attractant and the information and/or portion of the display associated with the information is determined to be within the user's field of vision.

For example, FIGS. 10A-10C illustrate an example embodiment of the present invention in which an intermediate visual attractant is presented in an intermediate position between the user's gaze and the information and/or portion of the display associated with the information to attract the user's gaze closer to the information and/or portion of the display associated with the information. Once, the user's gaze has moved such that the information and/or portion of the display associated with the information is within the user's field of vision, the intermediate visual attractant may be removed and, in some cases, another visual attractant may be presented closer to the information and/or portion of the display associated with the information.

With reference to FIG. 10A, the apparatus 102 embodied by the car 250 may determine the current location of the user's gaze at 215. Additionally, the car 250 may determine that the information (e.g., the famous building 291) and/or the portion 271 of the display 258 associated with the information is outside the user's field of vision 217. Thus, with reference to FIG. 10B, the apparatus 102 embodied by the car 250 may cause presentation of an intermediate visual attractant 243 on the display 258 within the user's field of vision 217. Then, with reference to FIG. 10C, once a user's gaze is determined to be moving toward the intermediate visual attractant 243, the car 250 may cause presentation of the intermediate visual attractant to cease. In such a manner, the user's gaze 215 may now be positioned such that the information (e.g., the famous building 291) and/or the portion 271 of the display 258 associated with the information is within the user's field of vision 217. As such, the user's gaze may now be attracted to the visual attractant 275, thereby attracting the user's gaze to move toward the visual attractant 275 and the information (e.g., the famous building 291) and/or the portion 271 of the display 258 associated with the information.

Embodiments of the present invention provide methods, apparatus and computer program products for attracting a user's gaze to information associated with a portion of a display in a non-intrusive manner. Various examples of the operations performed in accordance with embodiments of the present invention will now be provided with reference to FIGS. 11-13.

FIG. 11 illustrates a flowchart according to an example method for attracting a user's gaze to information associated with a portion of a display in a non-intrusive manner according to an example embodiment 300. The operations illustrated in and described with respect to FIG. 11 may, for example, be performed by, with the assistance of, and/or under the control of one or more of the processor 110, memory 112, communication interface 114, user interface 116, sensor 118, or UI control circuitry 122. Operation 302 may comprise determining to attract a user's gaze to information associated with a portion of a display. The processor 110, communication interface 114, user interface 116, sensor 118, and/or UI control circuitry 122 may, for example, provide means for performing operation 302. Operation 304 may comprise causing presentation of a visual attractant on the display proximate the portion of the display. The processor 110, user interface 116, and/or UI control circuitry 122 may, for example, provide means for performing operation 304. Operation 306 may comprise causing presentation of the visual attractant on the display to be ceased in an instance in which the user's gaze is determined to be moving toward the information. The processor 110, communication interface 114, user interface 116, sensor 118, and/or UI control circuitry 122 may, for example, provide means for performing operation 306.

FIG. 12 illustrates a flowchart according to an example method for attracting a user's gaze to information associated with a portion of a display in a non-intrusive manner according to an example embodiment 400. The operations illustrated in and described with respect to FIG. 12 may, for example, be performed by, with the assistance of, and/or under the control of one or more of the processor 110, memory 112, communication interface 114, user interface 116, sensor 118, or UI control circuitry 122. Operation 402 may comprise determining to attract a user's gaze to information associated with a portion of a display. The processor 110, communication interface 114, user interface 116, sensor 118, and/or UI control circuitry 122 may, for example, provide means for performing operation 402. Operation 404 may comprise determining an intensity of a visual attractant to be presented based at least in part on at least one of the following: a distance between the user's gaze and the portion of the display, an importance level associated with the information, and a number of attempts that have taken place to attract the user's gaze to the information. The processor 110 may, for example, provide means for performing operation 404.

Operation 406 may comprise causing presentation of a visual attractant at the intensity on the display proximate the portion of the display. The processor 110, user interface 116, and/or UI control circuitry 122 may, for example, provide means for performing operation 406. Operation 408 may comprise causing presentation of the visual attractant on the display to be ceased in an instance in which the user's gaze is determined to be moving toward the information. The processor 110, communication interface 114, user interface 116, sensor 118, and/or UI control circuitry 122 may, for example, provide means for performing operation 408.

FIG. 13 illustrates a flowchart according to an example method for attracting a user's gaze to information associated with a portion of a display in a non-intrusive manner according to an example embodiment 500. The operations illustrated in and described with respect to FIG. 13 may, for example, be performed by, with the assistance of, and/or under the control of one or more of the processor 110, memory 112, communication interface 114, user interface 116, sensor 118, or UI control circuitry 122. Operation 502 may comprise determining to attract a user's gaze to information associated with a portion of a display. The processor 110, communication interface 114, user interface 116, sensor 118, and/or UI control circuitry 122 may, for example, provide means for performing operation 502. Operation 504 may comprise causing presentation of a visual attractant on the display proximate the portion of the display. The processor 110, user interface 116, and/or UI control circuitry 122 may, for example, provide means for performing operation 504. Operation 506 may comprise causing presentation of the visual attractant on the display to be ceased in an instance in which the user's gaze is determined to be moving toward the information. The processor 110, communication interface 114, user interface 116, sensor 118, and/or UI control circuitry 122 may, for example, provide means for performing operation 506.

Operation 508 may comprise determining a second portion of the display where the user's gaze was focused before presentation of the visual attractant on the display. The processor 110, communication interface 114, user interface 116, sensor 118, and/or UI control circuitry 122 may, for example, provide means for performing operation 508. Operation 510 may comprise causing presentation of a second visual attractant on the display proximate the second portion of the display. The processor 110, user interface 116, and/or UI control circuitry 122 may, for example, provide means for performing operation 510.

FIGS. 11-13 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining, by a processor, to attract a user's gaze to information associated with a portion of a display;
   determining a focal point of the user's gaze;
   causing presentation of a visual attractant on the display proximate the portion of the display and in relation to the focal point of the user's gaze so as to attract the focal point of the user's gaze toward the information;
   determining an instance in which the focal point of the user's gaze is moving toward the information; and
   causing, in response to determining the instance in which the focal point of the user's gaze is moving toward the information, presentation of the visual attractant on the display to be ceased prior to the focal point of the user's gaze reaching the visual attractant such that the visual attractant is presented in a non-intrusive manner.

2. The method according to claim 1, wherein causing presentation of the visual attractant to be ceased comprises causing presentation of the visual attractant to be ceased before the user's gaze reaches the information.

3. The method according to claim 1 further comprising determining a first separation distance between the user's gaze and the portion of the display, and wherein causing presentation of the visual attractant comprises causing presentation of the visual attractant in an instance in which the first separation distance is approximately equal to or less than a first pre-determined distance.

4. The method according to claim 1 further comprising determining a second separation distance between the user's gaze and the portion of the display, wherein causing presentation of the visual attractant to be ceased comprises causing presentation of the visual attractant to be ceased in an instance in which the second separation distance is approximately a second pre-determined distance.

5. The method according to claim 1, wherein causing presentation of the visual attractant comprises causing presentation of the visual attractant in an instance in which the information is within a field of vision of the user.

6. The method according to claim 1 further comprising causing presentation of the visual attractant to resume in an instance in which the user's gaze is determined to not yet have focused on the information.

7. The method according to claim 1, wherein causing presentation of the visual attractant comprises:
   determining an intensity of the visual attractant to be presented based at least in part on at least one of the following: a distance between the user's gaze and the portion of the display, an importance level associated with the information, and a number of attempts that have taken place to attract the user's gaze to the information; and
   causing presentation of the visual attractant at the intensity.

8. The method according to claim 1 further comprising:
   determining a second portion of the display where the focal point of the user's gaze was focused before presentation of the visual attractant on the display;
   causing presentation of a second visual attractant proximate the second portion of the display so as to attract the focal point of the user's gaze back toward the second portion of the display;
   determining an instance in which the focal point of the user's gaze is moving toward the second portion of the display; and
   causing, in response to determining the instance in which the focal point of the user's gaze is moving toward the second portion of the display, presentation of the second visual attractant on the display to be ceased prior to the focal point of the user's gaze reaching the second visual attractant.

9. An apparatus comprising a processor and a memory including computer program code, the memory and the computer program code configured to, with the processor, cause the apparatus to:
   determine to attract a user's gaze to information associated with a portion of a display;
   determine a focal point of the user's gaze;
   cause presentation of a visual attractant on the display proximate the portion of the display and in relation to the focal point of the user's gaze so as to attract the focal point of the user's gaze toward the information;
   determine an instance in which the focal point of the user's gaze is moving toward the information; and
   cause, in response to determining the instance in which the focal point of the user's gaze is moving toward the information, presentation of the visual attractant on the display to be ceased prior to the focal point of the user's gaze reaching the visual attractant such that the visual attractant is presented in a non-intrusive manner.

10. The apparatus of claim 9, wherein the memory and the computer program code are further configured to, with the processor, cause the apparatus to cause presentation of the visual attractant to be ceased by causing presentation of the visual attractant to be ceased before the user's gaze reaches the information.

11. The apparatus of claim 9, wherein the memory and the computer program code are further configured to, with the processor, cause the apparatus to determine a first separation distance between the user's gaze and the portion of the display, and wherein the memory and the computer program code are further configured to, with the processor, cause the apparatus to cause presentation of the visual attractant by causing presentation of the visual attractant in an instance in which the first separation distance is approximately equal to or less than a first pre-determined distance.

12. The apparatus of claim 9, wherein the memory and the computer program code are further configured to, with the processor, cause the apparatus to determine a second separation distance between the user's gaze and the portion of the display, and wherein the memory and the computer program code are further configured to, with the processor, cause the apparatus to cause presentation of the visual attractant to be ceased by causing presentation of the visual attractant to be ceased in an instance in which the second separation distance is approximately a second pre-determined distance.

13. The apparatus of claim 9, wherein the memory and the computer program code are further configured to, with the processor, cause the apparatus to cause presentation of the visual attractant by causing presentation of the visual attractant in an instance in which the information is within a field of vision of the user.

14. The apparatus of claim 9, wherein the memory and the computer program code are further configured to, with the processor, cause the apparatus to cause presentation of the visual attractant to resume in an instance in which the user's gaze is determined to not yet have focused on the information.

15. The apparatus of claim 9, wherein the memory and the computer program code are further configured to, with the processor, cause the apparatus to cause presentation of the visual attractant by:
 determining an intensity of the visual attractant to be presented based at least in part on at least one of the following: a distance between the user's gaze and the portion of the display, an importance level associated with the information, and a number of attempts that have taken place to attract the user's gaze to the information; and
 causing presentation of the visual attractant at the intensity.

16. The apparatus of claim 9, wherein the memory and the computer program code are further configured to, with the processor, cause the apparatus to:
 determine a second portion of the display where the focal point of the user's gaze was focused before presentation of the visual attractant on the display;
 cause presentation of a second visual attractant proximate the second portion of the display so as to attract the focal point of the user's gaze back toward the second portion of the display;
 determine an instance in which the focal point of the user's gaze is moving toward the second portion of the display; and
 cause, in response to determining the instance in which the focal point of the user's gaze is moving toward the second portion of the display, presentation of the second visual attractant on the display to be ceased prior to the focal point of the user's gaze reaching the second visual attractant.

17. Computer program product comprising a non-transitory computer readable medium having program code portions stored thereon, the program code portions being configured when said program product is run on a computer or network device, to:
 determine to attract a user's gaze to information associated with a portion of a display;
 determine a focal point of the user's gaze;
 cause presentation of a visual attractant on the display proximate the portion of the display and in relation to the focal point of the user's gaze so as to attract the focal point of the user's gaze toward the information;
 determine an instance in which the focal point of the user's gaze is moving toward the information; and
 cause, in response to determining the instance in which the focal point of the user's gaze is moving toward the information, presentation of the visual attractant on the display to be ceased prior to the focal point of the user's gaze reaching the visual attractant such that the visual attractant is presented in a non-intrusive manner.

18. The computer program product of claim 17, wherein the program code portions are further configured when said program product is run on a computer or network device, to cause presentation of the visual attractant to be ceased by causing presentation of the visual attractant to be ceased before the user's gaze reaches the information.

19. The computer program product of claim 17, wherein the program code portions are further configured when said program product is run on a computer or network device, to determine a first separation distance between the user's gaze and the portion of the display, and wherein the program code portions are further configured when said program product is run on a computer or network device, to cause presentation of the visual attractant by causing presentation of the visual attractant in an instance in which the first separation distance is approximately equal to or less than a first pre-determined distance.

20. The computer program product of claim 17, wherein the program code portions are further configured when said program product is run on a computer or network device, to determine a second separation distance between the user's gaze and the portion of the display, and wherein the program code portions are further configured when said program product is run on a computer or network device, to cause presentation of the visual attractant to be ceased by causing presentation of the visual attractant to be ceased in an instance in which the second separation distance is approximately a second pre-determined distance.

21. The computer program product of claim 17, wherein the program code portions are further configured when said program product is run on a computer or network device, to:
 determine a second portion of the display where the focal point of the user's gaze was focused before presentation of the visual attractant on the display;
 cause presentation of a second visual attractant proximate the second portion of the display so as to attract the focal point of the user's gaze back toward the second portion of the display;
 determine an instance in which the focal point of the user's gaze is moving toward the second portion of the display; and
 cause, in response to determining the instance in which the focal point of the user's gaze is moving toward the second portion of the display, presentation of the second visual attractant on the display to be ceased prior to the focal point of the user's gaze reaching the second visual attractant.

* * * * *